US010318066B2

(12) United States Patent
Cordeiro et al.

(10) Patent No.: US 10,318,066 B2
(45) Date of Patent: Jun. 11, 2019

(54) CAPACITIVE-BASED TOUCH APPARATUS AND METHOD WITH REDUCED INTERFERENCE

(71) Applicant: 3M INNOVATIVE PROPERTIES COMPANY, St. Paul, MN (US)

(72) Inventors: Craig A. Cordeiro, Westford, MA (US); Thomas J. Rebeschi, Merrimack, NH (US); Bernard O. Geaghan, Salem, NH (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 77 days.

(21) Appl. No.: 15/324,369

(22) PCT Filed: Aug. 5, 2015

(86) PCT No.: PCT/US2015/043700
§ 371 (c)(1),
(2) Date: Jan. 6, 2017

(87) PCT Pub. No.: WO2016/032704
PCT Pub. Date: Mar. 3, 2016

(65) Prior Publication Data
US 2017/0212635 A1    Jul. 27, 2017

Related U.S. Application Data

(60) Provisional application No. 62/041,307, filed on Aug. 25, 2014.

(51) Int. Cl.
*G06F 3/041*    (2006.01)
*G06F 3/044*    (2006.01)

(52) U.S. Cl.
CPC .......... *G06F 3/0418* (2013.01); *G06F 3/044* (2013.01); *G06F 3/0416* (2013.01); *G06F 2203/04104* (2013.01)

(58) Field of Classification Search
None
See application file for complete search history.

(56) References Cited

U.S. PATENT DOCUMENTS

| 8,890,841 B2 | 11/2014 | Rebeschi |
| 2008/0158178 A1 | 7/2008 | Hotelling et al. |

(Continued)

FOREIGN PATENT DOCUMENTS

| EP | 1298795 | 4/2003 |
| EP | 2778868 | 12/2016 |

(Continued)

OTHER PUBLICATIONS

International Search Report for PCT International Application No. PCT/US2015/043700 dated Jan. 29, 2016, 8 pages.

*Primary Examiner* — Adam R. Giesy
(74) *Attorney, Agent, or Firm* — Jonathan L. Tolstedt

(57) ABSTRACT

A touch-sensitive apparatus includes a touch panel comprising a touch sensitive surface and at least one a drive electrode capacitively coupled to at least one receive electrode. A sense circuit generates a response signal for the receive electrode in response to a drive signal delivered to the drive electrode. A measurement circuit applies a time-varying transfer function to the response signal. The transfer function varies proportionately and synchronously with the response signal. A calibration circuit is used to match the time-varying transfer function to the response signal.

54 Claims, 29 Drawing Sheets

(56) References Cited

U.S. PATENT DOCUMENTS

| | | |
|---|---|---|
| 2011/0157067 A1 | 6/2011 | Wagner |
| 2012/0013564 A1 | 1/2012 | Westhues |
| 2012/0062498 A1 | 3/2012 | Weaver |
| 2012/0256869 A1 | 10/2012 | Walsh |
| 2012/0268144 A1 | 10/2012 | Ahn |
| 2012/0274404 A1 | 11/2012 | Erdogan |
| 2013/0162586 A1 | 6/2013 | Erdogan |
| 2013/0176269 A1 | 7/2013 | Sobel et al. |
| 2014/0267129 A1* | 9/2014 | Rebeschi ............ G06F 3/0418 345/174 |
| 2015/0002463 A1 | 1/2015 | Kanazawa |

FOREIGN PATENT DOCUMENTS

| | | |
|---|---|---|
| JP | 2010-049608 | 3/2010 |
| WO | WO 2010-138485 | 12/2010 |

* cited by examiner

CAPACITIVE-BASED TOUCH APPARATUS AND METHOD WITH REDUCED INTERFERENCE

FIELD OF THE INVENTION

This disclosure relates generally to touch-sensitive devices, particularly those that rely on a capacitive coupling between a user's finger or other touch implement and the touch device, with particular application to such devices that are capable of detecting multiple touches applied to different portions of the touch device at the same time.

BACKGROUND

Touch sensitive devices can be implemented to allow a user to interface with electronic systems and displays conveniently, for example, by providing a display input that is typically prompted by a visual in the display for user-friendly interaction and engagement. In some instances, the display input complements other input tools such as mechanical buttons, keypads and keyboards. In other instances, the display input acts as an independent tool for reducing or eliminating the need for mechanical buttons, keypads, keyboards and pointing devices. For example, a user can carry out a complicated sequence of instructions by simply touching an on-display touch screen at a location identified by an icon or by touching a displayed icon in conjunction with another user input.

There are several types of technologies for implementing a touch sensitive device including, for example, resistive, infrared, capacitive, surface acoustic wave, electromagnetic, near field imaging, etc., and combinations of these technologies. Touch sensitive devices that use capacitive touch sensing devices have been found to work well in a number of applications. In many touch sensitive devices, the input is sensed when a conductive object in the sensor is capacitively coupled to a conductive touch implement such as a user's finger. Generally, whenever two electrically conductive members come into proximity with one another without actually touching, a capacitance is formed therebetween. In the case of a capacitive touch sensitive device, as an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the characteristics of the object as it is moved across the touch surface.

Different techniques have been used to measure touch based on such capacitive changes. One technique measures change in capacitance-to-ground, whereby the status of an electrode is understood based on the capacitive condition of a signal that is applied to the electrode before a touch would alter the signal. A touch in proximity to the electrode causes signal current to flow from the electrode, through an object such as a finger or touch stylus, to electrical ground. By detecting the change in capacitance at the electrode and also at various other points on the touch screen, the sensing circuit can note the position of the points and thereby recognize the location on the screen where the touch occurred. Also, depending on the complexity of the sensing circuit and related processing, various characteristics of the touch can be assessed for other purposes such as determining whether the touch is one of multiple touches, and whether the touch is moving and/or satisfies expected characteristics for certain types of user inputs.

Another known technique monitors touch-related capacitive changes by applying a signal to a signal-drive electrode, which is capacitively coupled to a signal-receive electrode by an electric field. As these terms connote, with the signal-receive electrode returning an expected signal from the signal-drive electrode, an expected signal (capacitive charge) coupling between the two electrodes can be used to indicate the touch-related status of a location associated with the two electrodes. Upon or in response to an actual or perceived touch at/near the location, the status of signal coupling changes, and this change is reflected by a reduction in the capacitive coupling.

For these and other related capacitive-touch sensing techniques, various methodologies have been used to measure the mutual capacitance between electrodes. Depending on the applications, these methodologies might specify different types and speeds of signals through which the signal-drive electrode would provide the expected signals to the signal-drive electrode, from which a change in capacitive charge is sensed. With the growing trend in higher-speed electronics, many such applications are requiring that relatively higher-frequency signals be used for driving the signal-drive electrodes. Unfortunately, RF (radio-frequency) interference can ensue from both the higher-speed electronics and such signals generated therefrom. This RF interference can degrade and, in some applications, can undermine the effectiveness of the sensing circuits and related processing for the associated touch display. Adverse effects can include speed of detection, accuracy and power consumption.

The above issues are examples of those that have presented challenges to the effective designs of touch-sensitive displays and related methods for locating and assessing the touches.

BRIEF SUMMARY

Aspects of the present disclosure are directed to overcoming the above-mentioned challenges and others related to the effective designs of touch-sensitive displays and related methods for locating and assessing the touches for the types of touch displays as discussed above and elsewhere. The present disclosure is exemplified in a number of implementations and applications, some of which are summarized below.

Some embodiments are directed to a touch-sensitive apparatus that includes at least one drive electrode capacitively coupled to a receive electrode. A sense circuit is configured to generate a response signal for the receive electrode in response to a drive signal delivered to the drive electrode. The response signal includes a positive-going transition portion separated from a negative-going transition portion. An amplification circuit has a time-varying gain having an increased gain substantially aligned with the positive- and negative-going transition portions of the response signal and a reduced gain between the positive- and negative-going transition portions of the response signal.

Some embodiments involve an amplification circuit comprising a time-varying time constant that has smaller values substantially aligned with the positive- and negative-going transition portions of the response signal and greater values between the positive- and negative-going transition portions of the response signal.

Further embodiments are directed to a touch-sensitive apparatus comprising a drive electrode capacitively coupled to a receive electrode. A sense circuit is configured to generate a response signal for the receive electrode in response to a drive signal delivered to the drive electrode, the response signal comprising a harmonic of the drive signal. An amplification circuit comprising a time-varying gain has reduced gain in a frequency range corresponding to the harmonic.

In some embodiments, a touch-sensitive apparatus comprising a drive electrode capacitively coupled to a receive electrode includes a sense circuit coupled to the receive electrode. The sense circuit includes first stage coupled to the receive electrode and configured to generate a response signal for the receive electrode in response to a drive signal delivered to the drive electrode. The response signal is a differentiated representation of the drive signal and includes at least one odd harmonic and at least one even harmonic of the drive signal. A second stage of the sense circuit is coupled to an output of the first stage and is configured to suppress the at least one odd harmonic in the response signal. A third stage of the sense circuit is capacitively coupled to an output of the second stage and amplifies an output of the second stage. The third state suppresses the at least one even harmonic in the response signal.

Some embodiments comprise a touch-sensitive apparatus that includes a drive electrode capacitively coupled to a receive electrode. A sense circuit generates a response signal for the receive electrode in response to a drive signal delivered to the drive electrode, the response signal comprises a positive-going transition portion separated from a negative-going transition portion. An amplifier is configured to amplify the response signal with a non-linear gain. An integrator subtracts the negative-going transition portion of the response signal from the positive-going transition portion of the response signal.

In some embodiments, a touch-sensitive apparatus includes a touch panel comprising a touch sensitive surface and at least one a drive electrode capacitively coupled to at least one receive electrode. A sense circuit generates a response signal for the receive electrode in response to a drive signal delivered to the drive electrode. A measurement circuit applies a time-varying transfer function to the response signal. The transfer function varies proportionately and synchronously with the response signal. Some embodiments further include a calibration circuit that matches the time-varying transfer function to the response signal.

Some embodiments are directed to a method of operating a touch sensitive apparatus. The method involves sensing a response signal on a receive electrode in response to a drive signal delivered to a drive electrode that is capacitively coupled to the receive electrode. A time-varying transfer function is applied to the response signal, the transfer function varying proportionately and synchronously with the response signal. A touch on a touch sensitive surface is detected using a result of the applying of the transfer function to the response signal.

Some embodiments involve a method of using a touch apparatus that includes a touch sensitive panel comprising at least one drive electrode capacitively coupled to at least one receive electrode. The method includes determining shape of a response signal for the receive electrode in response to a drive signal delivered to the drive electrode. A time-varying transfer function is formed, the time-varying transfer function varying proportionately and synchronously with the response signal. The time-varying transfer function is applied to a response signal that includes information about a touch on the touch panel.

Some embodiments are directed to a method of calibrating a touch sensitive panel comprising a plurality of drive electrodes capacitively coupled to a plurality of receive electrodes. For each receive electrode a shape of a response signal for the receive electrode in response to a drive signal delivered to the drive electrode is determined and a time-varying transfer function is formed that varies proportionately and synchronously with the response signal.

Methodologies and further aspects of these embodiments and other embodiments are discussed in more detail below.

The above summary is not intended to describe each illustrated embodiment or every implementation of the present disclosure.

BRIEF DESCRIPTION OF DRAWINGS

The disclosure may be more completely understood in consideration of the following detailed description of various embodiments of the disclosure in connection with the accompanying drawings in which, according to the instant disclosure.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Aspects of the present disclosure are believed to be applicable to a variety of different types of touch-sensitive display systems, devices and methods including those involving circuitry that is susceptible to creating RF interference on response signals used to indicate where a touch event may have occurred at the touch display device. While the present disclosure is not necessarily limited to such circuitry and applications, various aspects of the disclosure may be appreciated through a discussion of various examples using this context.

According to certain example embodiments, the present disclosure is directed to touch-sensitive apparatuses of the type that include a touch surface circuit configured to facilitate a change in a coupling capacitance in response to a capacitance-altering touch. The apparatus includes at least one drive electrode capacitively coupled to a receive electrode. A sense circuit generates a response signal for the receive electrode in response to a drive signal delivered to the drive electrode. The response signal includes a positive-going transition portion separated from a negative-going transition portion. An amplification circuit is then used for amplifying and processing the signals, in response to the time-varying input parameters. The amplification circuit has a time-varying gain with maximum gain substantially aligned with the positive- and negative-going transition portions of the response signal and reduced gain between the positive and negative going transition portions. The amplification circuit adjusts the gain for the transient portions relative to gain for portions of the response signals between the transient portions. The amplification circuit suppresses radio frequency (RF) interference, such as in the form of odd and/or even harmonics, to provide a noise filtered output for determining positions of capacitance-altering touches on the touch surface. For example, according to some aspects, the amplification circuit has a time-varying time constant. Reduced or minimum values of the time constant are substantially aligned with the positive and negative going transition portions of the response signal and having increased values of the time constant are substantially aligned with portions of the response signal between the positive and negative going transition portions.

Figure 1A:
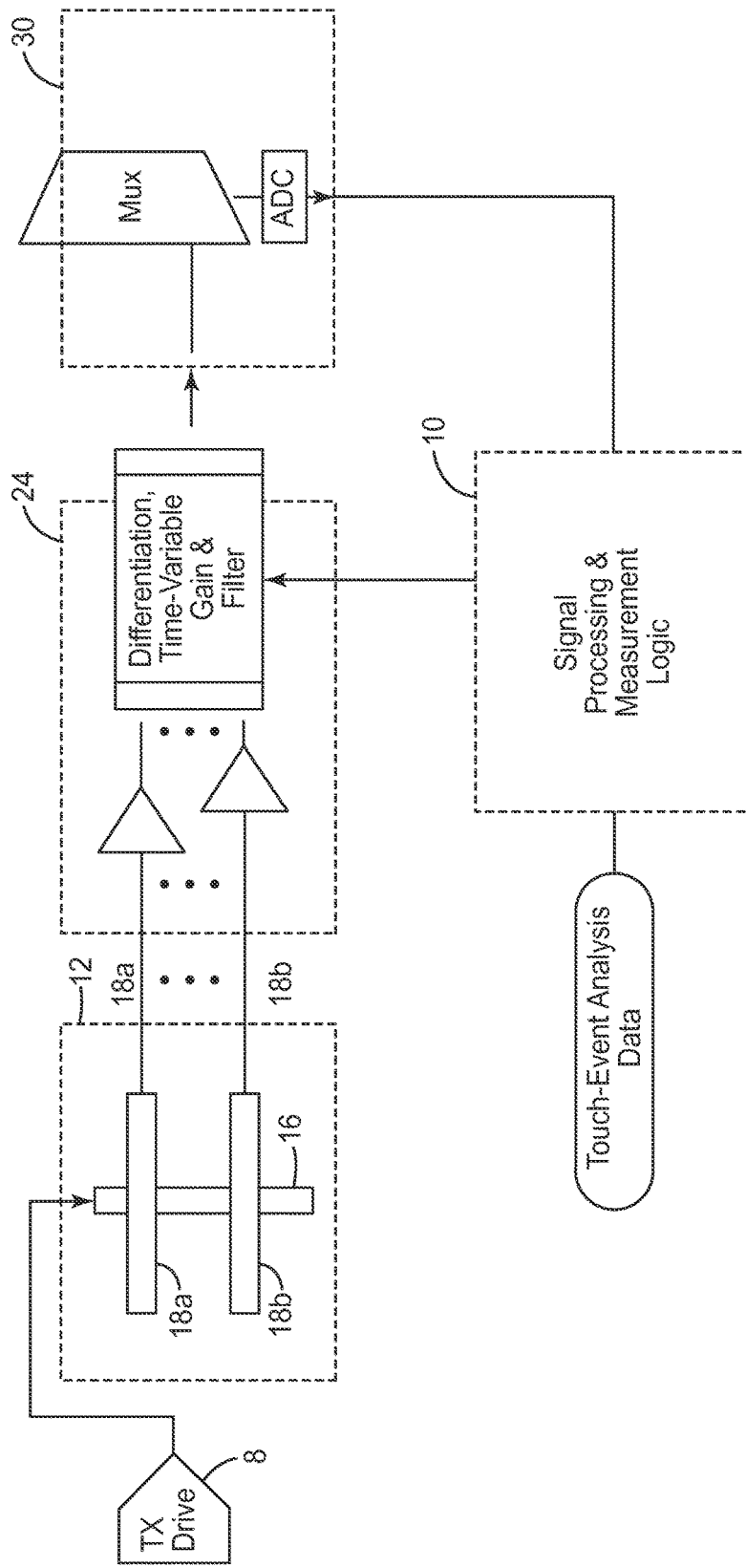
FIG. 1A is a schematic view of a touch device.

FIG. 1A illustrates a specific example of the above-noted type of touch device that includes, also in accordance with the present disclosure, a touch surface circuit 12, a sense circuit 24, and digital conversion circuitry 30. The touch surface circuit 12, the sense circuit 24, and the digital conversion circuitry 30 are cooperatively designed, as with the above-described embodiment, to suppress RF interference and thereby provide a noise filtered output for determining positions of capacitance-altering touches on the touch surface. For many applications, included as part of the touch device are drive circuitry 8 and data processing logic (e.g., microcomputer circuit) 10. The drive circuitry 8, which can be external or internal to the touch device, is configured for providing the drive electrode 16 in the touch surface circuit 12 with a bias drive signal that can be used for providing a reference through which capacitance-altering touch events can be sensed at a capacitive node, and later processed by the data processing logic 10. For many applications, the drive circuitry 8 alone and/or with other high-frequency coupling circuitry, generates a high frequency signals from which RF-noise interference is of concern. The RF-noise interference may be present in the form of harmonics frequencies developed directly from the drive signal produced by the drive circuitry 8. This drive circuitry 8 is often used for driving other circuits and/or producing other high frequency signals, such as used with the above-noted microcomputer and signal-sampling circuits involved in analog-to-digital conversion circuits. The touch panel 12 can be susceptible to RF noise sources related to the display electronics and other external RF noise generators.

Consistent with the above discussion, this RF-noise interference is lessened, if not completely removed, by processing the change in a coupling capacitance via a response signal, that is returned via receive electrodes 18a and 18b (FIG. 1A) using the sense circuit 24. The sense circuit 24 provides a responsive signal, referred to as a response signal, having transient portions for characterizing positive-going transitions towards an upper signal level and negative-going transitions towards a lower signal level (as discussed in below with, for example, with FIGS. 3B and 6B).

Within the sense circuit 24, gain and filtering circuitry is then used for amplifying and processing the signals, in response to time-varying input parameters that estimate these transient portions. The sense circuit 24 thereby adjusts the gain for the transient portions relative to gain for portions of the response signals between the transient portions, and thereby suppresses RF interference. To appreciate how these transient portions are created to represent the response signal, FIG. 1B is presented below with more details regarding the development of the capacitance-altering signals that are developed in connection with the drive and receive electrodes of the touch panel.

Accordingly, using a touch device along with relevant controller circuitry, a sense circuit and an amplification circuit can be used for processing response signals, as developed via the return paths from receive electrodes of a touch panel, for detecting changes in capacitance at associated locations or nodes of the touch panel. It will be appreciated that such a touch panel might have an application-specific layout for the drive electrode(s) and receive electrode(s) such as through an organized arrangement of a plurality of receive electrodes relative to one or more drive electrodes, the latter of which can be arranged with a plurality of receive electrodes to provide a matrix where the application would require the provision of many specific touch-panel nodes at electrode crossing points of the matrix. As an example of another application, a drive electrode might be provided in the form of an ITO or nano-mesh relative to one or more receive electrodes, each of which would provide a differentiable response signal based location and/or signal characteristic (e.g., amplitude, shape, modulation type, and/or phase).

Figure 1B:
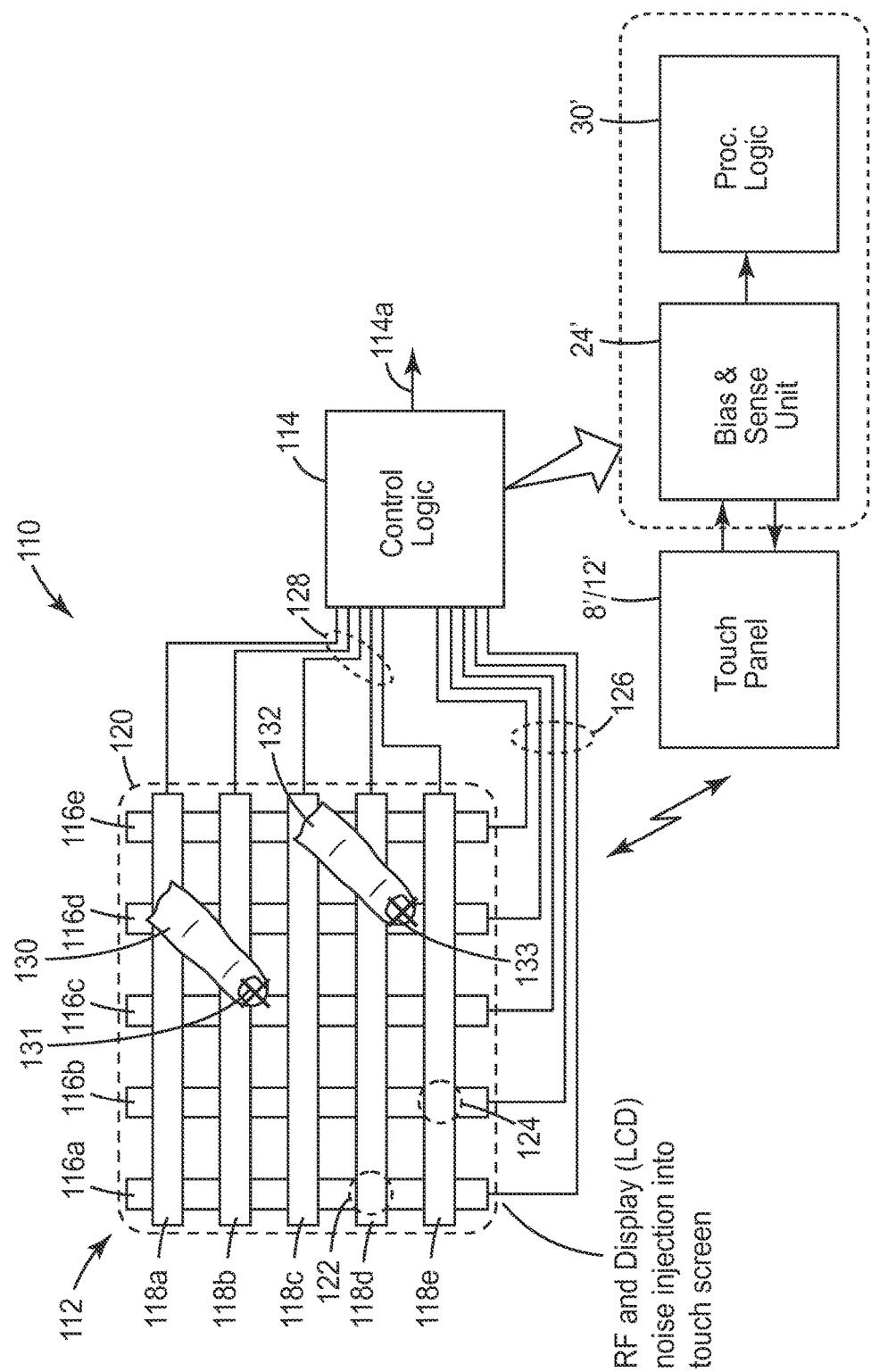
FIG. 1B is a schematic view of another touch device.

In FIG. 1B, an exemplary touch device 110 is shown. The device 110 includes a touch panel 112 connected to electronic circuitry, which for simplicity is grouped together into a single schematic box labeled 114 and referred to collectively as a controller which is implemented as (control) logic circuitry such as including analog-signal interface circuitry, a microcomputer, processor and/or programmable logic array. Thus, the controller 114 is shown as encompassing aspects of bias circuitry and touch surface circuitry 8'/12' (relative to touch panel 112 of FIG. 1A), and sense circuit 24' (relative to sense circuit 24 of FIG. 1A) and a processor logic unit 30' (relative to digital conversion circuitry 30 of FIG. 1A).

The touch panel 112 is shown as having a 5×5 matrix of column electrodes 116a-e and row electrodes 118a-e, but other numbers of electrodes and other matrix sizes can also be used. For many applications, the touch panel 112 is exemplified as being transparent or semi-transparent to permit the user to view an object through the touch panel. Such applications include, for example, objects for the pixilated display of a computer, hand-held device, mobile phone, or other peripheral device. The boundary 120 represents the viewing area of the touch panel 112 and also preferably the viewing area of such a display, if used. The electrodes 116a-e, 118a-e are spatially distributed, from a plan view perspective, over the boundary 120. For ease of illustration the electrodes are shown to be wide and obtrusive, but in practice they may be relatively narrow and inconspicuous to the user. Further, they may be designed to have variable widths, e.g., an increased width in the form of a diamond- or other-shaped pad in the vicinity of the nodes of the matrix in order to increase the inter-electrode fringe field and thereby increase the effect of a touch on the electrode-to-electrode capacitive coupling. In exemplary embodiments, the electrodes may be composed of indium tin oxide (ITO) or other suitable electrically conductive materials. From a depth perspective, the column electrodes may lie in a different plane than the row electrodes (from the perspective of FIG. 1B, the column electrodes 116a-e lie underneath the row electrodes 118a-e) such that no significant ohmic contact is made between column and row electrodes, and so that the only significant electrical coupling between a given column electrode and a given row electrode is capacitive coupling. The matrix of electrodes typically lies beneath a cover glass, plastic film, or the like, so that the electrodes are protected from direct physical contact with a user's finger or other touch-related implement. An exposed surface of such a cover glass, film, or the like may be referred to as a touch surface. Additionally, in display-type applications, a back shield (as an option) may be placed between the display and the touch panel 112. Such a back shield typically consists of a conductive ITO coating on a glass or film, and can be grounded or driven with a waveform that reduces signal coupling into touch panel 112 from external electrical interference sources. Other approaches to back shielding are known in the art. In general, a back shield reduces noise sensed by touch panel 112, which in some embodiments may provide improved touch sensitivity (e.g., ability to sense a lighter touch) and faster response time. Back shields are sometimes used in conjunction with other noise reduction approaches, including spacing apart touch panel 112 and a display, as noise strength from LCD displays, for example, rapidly decreases over distance. In addition to these techniques, other approaches to dealing with noise problems are discussed in reference to various embodiments, below.

The capacitive coupling between a given row and column electrode is primarily a function of the geometry of the electrodes in the region where the electrodes are closest together. Such regions correspond to the "nodes" of the electrode matrix, some of which are labeled in FIG. 1B. For example, capacitive coupling between column electrode 116a and row electrode 118d occurs primarily at node 122, and capacitive coupling between column electrode 116b and row electrode 118e occurs primarily at node 124. The 5×5 matrix of FIG. 1B has such nodes, anyone of which can be addressed by controller 114 via appropriate selection of one of the control lines 126, which individually couple the respective column electrodes 116a-e to the controller, and appropriate selection of one of the control lines 128, which individually couple the respective row electrodes 118a-e to the controller.

When a finger 130 of a user or other touch implement comes into contact or near-contact with the touch surface of the device 110, as shown at touch location 131, the finger capacitively couples to the electrode matrix. The finger draws charge from the matrix, particularly from those electrodes lying closest to the touch location, and in doing so it changes the coupling capacitance between the electrodes corresponding to the nearest node(s). For example, the touch at touch location 131 lies nearest the node corresponding to electrodes 116c/118b. As described further below, this change in coupling capacitance can be detected by controller 114 and interpreted as a touch at or near the 116a/118b node. Preferably, the controller is configured to rapidly detect the change in capacitance, if any, of all of the nodes of the matrix, and is capable of analyzing the magnitudes of capacitance changes for neighboring nodes so as to accurately determine a touch location lying between nodes by interpolation. Furthermore, the controller 114 advantageously is designed to detect multiple distinct touches applied to different portions of the touch device at the same time, or at overlapping times. Thus, for example, if another finger touches the touch surface of the device 110 at touch location 133 simultaneously with the touch of finger 130, or if the respective touches at least temporally overlap, the controller is preferably capable of detecting the positions 131, 133 of both such touches and providing such locations on a touch output 114a. The number of distinct simultaneous or temporally overlapping touches capable of being detected by controller 114 is preferably not limited to 2, e.g., it may be 3, 4, or greater than 60, depending on the size of the electrode matrix.

As discussed further below, the controller 114 can employ a variety of circuit modules and components that enable it to rapidly determine the coupling capacitance at some or all of the nodes of the electrode matrix. For example, the controller preferably includes at least one signal generator or drive unit. The drive unit delivers a drive signal to one set of electrodes, referred to as drive electrodes. In the embodiment of FIG. 1B, the column electrodes 116a-e may be used as drive electrodes, or the row electrodes 118a-e may be so used. The drive signal is preferably delivered to one drive electrode at a time, e.g., in a scanned sequence from a first to a last drive electrode. As each such electrode is driven, the controller monitors the other set of electrodes, referred to as receive electrodes. The controller 114 may include one or more sense units coupled to all of the receive electrodes. For each drive signal that is delivered to each drive electrode, the sense unites) generate response signals for the plurality of receive electrodes. Preferably, the sense units are designed such that each response signal comprises a differentiated representation of the drive signal. For example, if the drive signal is represented by a function f(t) (e.g., representing a voltage as a function of time), then the response signal may be equal to, or provide an approximation of, a function g(t), where g(t)=d f(t)/dt. In other words, g(t) is the derivative with respect to time of the drive signal f(t). Depending on the design details of the circuitry used in the controller 114, the response signal may include signals such as: (1) g(t) alone; or (2) g(t) with a constant offset (g(t)+a); or (3) g(t) with a multiplicative scaling factor (b*g(t)), the scaling factor capable of being positive or negative, and capable of having a magnitude greater than 1, or less than 1 but greater than 0; or (4) combinations thereof. In any case, the amplitude of the response signal is advantageously related to the coupling capacitance between the drive electrode being driven and the particular receive electrode being monitored. The amplitude of g(t) is also proportional to the amplitude of the original function f(t), and if appropriate for the application the amplitude of g(t) can be determined for a given node using only a single pulse of a drive signal.

The controller may also include circuitry to identify and isolate the amplitude of the response signal. Exemplary circuit devices for this purpose may include one or more peak detectors, sample/hold buffer, time variable integrator and/or second stage integrator low-pass filter, the selection of which may depend on the nature of the drive signal and the corresponding response signal. The controller may also include one or more analog-to-digital converters (ADCs) to convert the analog amplitude to a digital format. One or more multiplexers may also be used to avoid unnecessary duplication of circuit elements. Of course, the controller also preferably includes one or more memory devices in which to store the measured amplitudes and associated parameters, and a microprocessor to perform the necessary calculations and control functions.

By measuring the amplitude of the response signal for each of the nodes in the electrode matrix, the controller can generate a matrix of measured values related to the coupling capacitances for each of the nodes of the electrode matrix. These measured values can be compared to a similar matrix of previously obtained reference values in order to determine which nodes, if any, have experienced a change in coupling capacitance due to the presence of a touch.

From the side, a touch panel for use in a touch device can include a front (transparent) layer, a first electrode layer with a first set of electrodes arranged in parallel, an insulating layer, a second electrode layer with a second set of electrodes arranged in parallel and preferably orthogonal to the first set of electrodes, and a rear layer. The exposed front surface layer may be part of or attached to the touch surface of the touch panel.

Figure 2A:
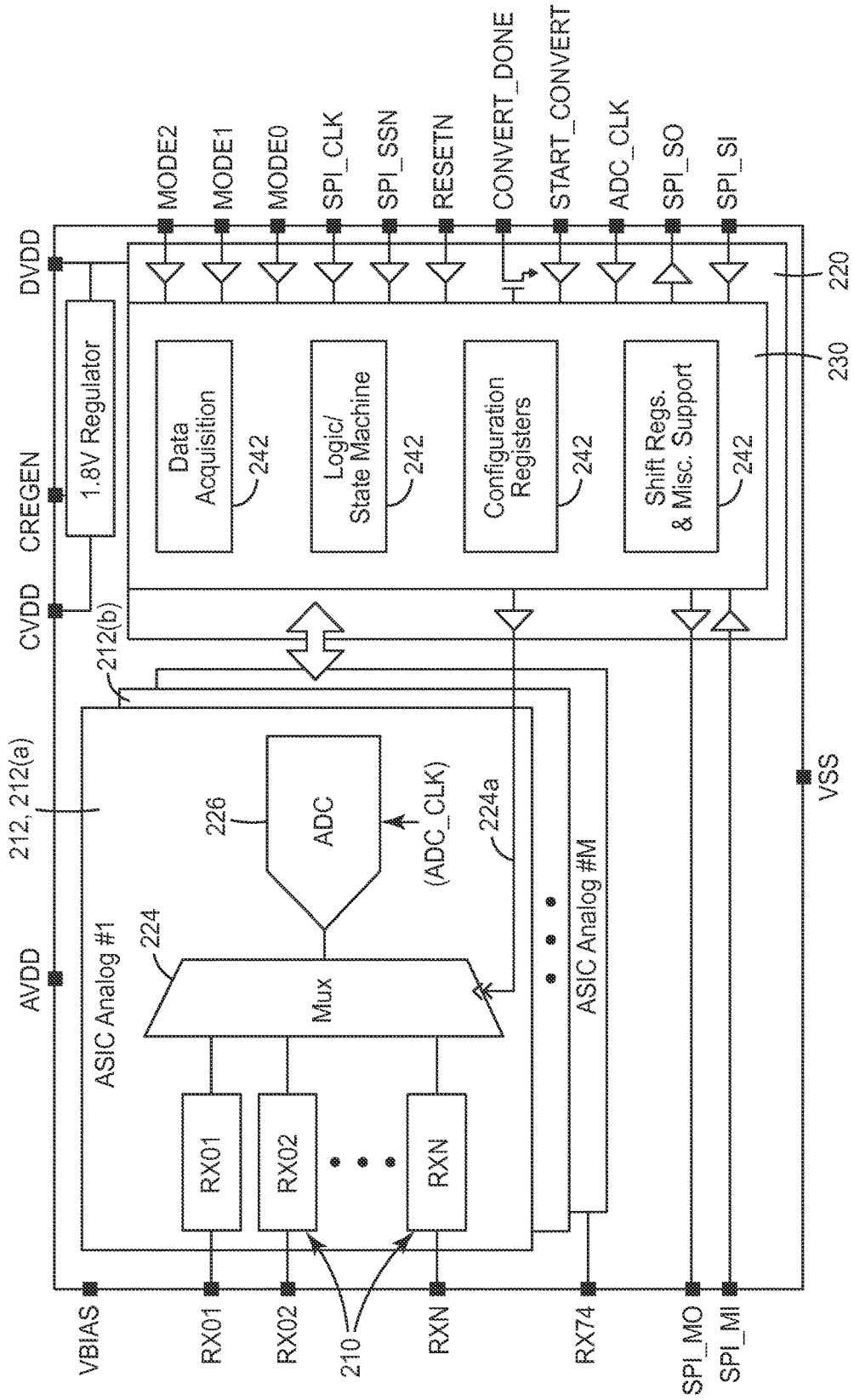
FIG. 2A is a schematic view of yet another touch device, showing circuit modules configured for specific embodiments in which response signals are processed along parallel signal paths for a measurement module (or circuit)

FIG. 2A is a schematic view of another touch device, consistent with many of the above-discussed aspects, showing a front-end circuit module 212 (or optionally operating as one of multiple front-end modules 212(a), 212(b), etc. in parallel) and a back-end circuit module 220 configured for certain analog and digital processing, respectively, of response signals provided from electrodes of a touch panel (not shown). In specific embodiments, including those represented by FIG. 2A, the back-end circuit module 220 is implemented in concert with other circuitry (as with the controller 114 of FIG. 1B) for providing various timing and control signals such as those shown along the right side of the back-end circuit module 220.

As depicted via the (optionally-replicated blocks on) the left side of FIG. 2A, response-signal circuits 210 operate on the respective response signals provided via associated input ports RX01, RX02, etc. As will be discussed further in connection with FIG. 3A, these response-signal circuits 210 are implemented to operate on and provide accurate touch monitoring (of the associated coupling capacitance at the touch surface) for the touch panel nodes associated with the corresponding (signal-feeding) receive electrode (FIG. 1B). While these response-signal circuits 210 can be implemented to operate and provide such touch monitoring concurrently, in the illustrated example, the output port of only one of these response-signal circuits 210 is selected through a multiplexer ("Mux") 224 for such processing.

The multiplexer 224, in response to an input-selection/control signal 224a, provides a selected channel of the analog-processed response signals, as defined by the associated response signal path, to an analog-to-digital converter (ADC) 226. The multiplexer 224 can be controlled to step through the RXN channels until all the electrodes are converted by the ADC. The ADC 226 presents a digital version of the analog-processed response signals to a measurement circuit 230 (in the back-end circuit module 220) that is configured for responding to the response signals by performing measurements on characterizations of the previously-discussed associated coupling capacitance and by determining from these characterizations positions of touches on the touch surface. As would be typical for an over-sampling ADC, the ADC 226 is responsive to an ADC_clock signal provided via input port 232 and operating, for example, at about 8 MHz or a multiple thereof.

In specific embodiments, one or both of the front-end and back-end circuit modules 212 and 220 are implemented in application-specific-integrated-circuit (ASIC) chips as depicted the boundary lines defining modules 212 and 220. For example, the front-end circuit module 212 can be implemented using one ASIC chip with each of one or more (replicated) internal circuits configured for processing one or more of the response signal paths from the receive electrode(s) and with the back-end circuit module implemented using another ASIC chip configured with measurement circuitry for performing measurements on the response signals.

In each such specific embodiment, both modules 212 and 220 use data, timing and control signals to effect proper processing of the response signals by the response-signal circuits 210. For example, to the left of the front-end module 212, these control signals include a voltage bias signal ($V_{Bias}$) as used for biasing nodes of circuits used for integrating the response signals within the response-signal circuits 210. The front-end module 212 is also responsive to control/configuration signals provided by the back-end circuit module 220, including control/configuration signals used to set time-variable parameters for controlling the gain, timing and generally processing of the response signals by the response-signal circuits 210. A configuration register 240, within the measurement circuit 230, can be used to fix these time-variable parameters and other control signals as may be needed for a given touch pad (or other type device feeding the receive electrodes). The measurement circuit 230 also includes related support circuits for acquiring and storing these processed response signals (data acquisition logic) and circuitry illustrated in the form of state machine circuitry 244 and miscellaneous register/support circuitry 246 as would be appreciated for an ASIC-based implementation.

As those shown along the right side of the back-end circuit module 220, other timing and control signals are provided to assist in the timing of the processing by the response-signal circuits 210 and of the ADC 226. These signals include Mode control, serial peripheral interface compatible (SPI) control lines and data receive and transmit and a control for when the receive logic starts converting the row data (along the receive electrode(s)) and when the data conversion is completed. The signals are shown on the right hand side of the figure.

Figure 2B:
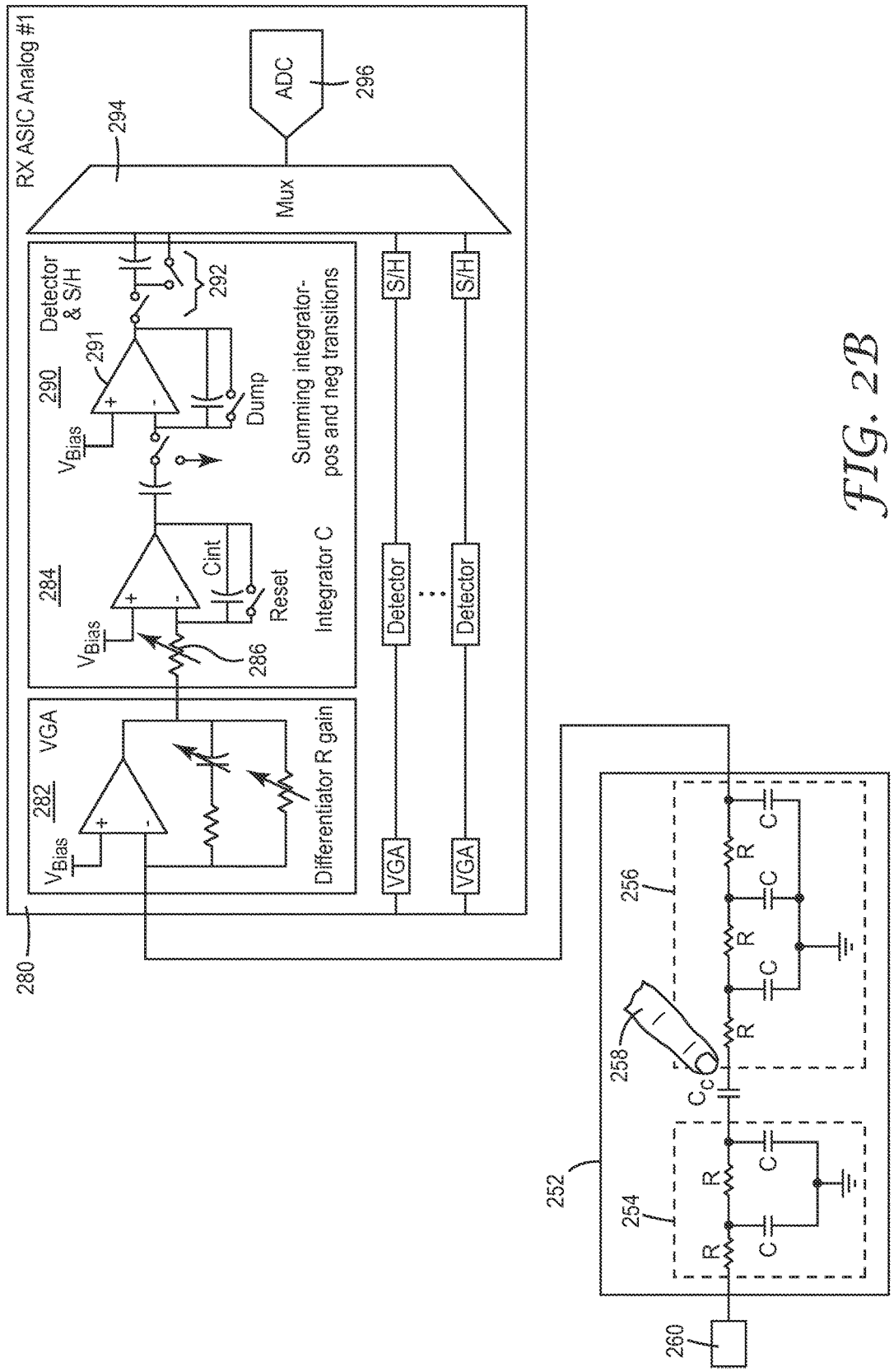
FIG. 2B is a schematic view of a portion of the touch device of FIG. 2A, showing exemplary modules for specific embodiments involving circuits for processing the response signals along one of the parallel signal paths.

FIG. 2B illustrates an example circuit with an exploded view corresponding to one of the previously-illustrated touch panels (12 of FIG. 1A or 112 of FIG. 1B) and the front-end circuit module of FIG. 2A. As contemplated with one such touch-panel implementation, the touch panel may include a 40-rows-by-64-columns matrix device having a 19-inch diagonal rectangular viewing area with a 16:10 aspect ratio. In this case, the electrodes may have a uniform spacing of about 0.25 inches and, in other specific embodiments, can be 0.2 inches or less. Due to the size of this embodiment, the electrodes may have significant stray impedances associated therewith, e.g., a resistance of 40 K ohms for the row electrodes and 64 K ohms for the column electrodes. Taking into account the human factors involved with such touch response processing, the response time to measure the coupling capacitance at all 2,560 nodes of the matrix (40×64=2560) may, if desired, be made to be relatively fast, e.g., less than 20 or even less than 10 milliseconds. If the row electrodes are used as the drive electrodes and the column electrodes used as the receive electrodes, and if all of the column electrodes are sampled simultaneously, then the 40 rows of electrodes have, for example, 20 msec (or 10 msec) to be scanned sequentially, for a time budget of 0.5 msec (or 0.25 msec) per row electrode (drive electrode).

Referring again to the specific illustration of FIG. 2A, the drive electrode 254 and receive electrode 256 of FIG. 2A, which are depicted by their electrical characteristics (in the form of lumped circuit element models) rather than by their physical characteristics, are representative of electrodes that may be found in a touch device having a matrix smaller than 40×64, but this is not to be considered limiting. In this representative embodiment of FIG. 2A, the series resistances R shown in the lumped circuit models may each have values of 10K ohms, and the stray capacitances C shown in the lumped circuit models may each have values of 20 picofarads (pf), but of course these values are not to be taken as limiting in any way. In this representative embodiment the coupling capacitance Cc is nominally 2 pf, and the presence of a touch by a user's finger 258 at the node between electrodes 254, 256 causes the coupling capacitance Cc to drop by about 25%, to a value of about 1.5 pf. Again, these values are not to be taken as limiting.

In accordance with the controller described earlier, such a touch device uses specific circuitry to interrogate the panel 252 to determine the coupling capacitance Cc at each of the nodes of the panel 252. In this regard, the controller can determine the coupling capacitance by determining the value of a parameter that is indicative of, or responsive to, the coupling capacitance, e.g., the amplitude of a response signal as mentioned above and described further below. To accomplish this task, the touch device preferably includes: a low impedance drive unit (within controller 114 of FIG. 1B or signal generator 260 of FIG. 2B) coupled to the drive electrode 254; a sense unit 280 coupled to the receive electrode 256; and an analog-to-digital converter (ADC) unit 226 that converts an amplitude of the response signal generated by the sense unit 280 into a digital format. The sense unit 280 includes a differentiating variable-gain amplification (VGA) circuit 282 which performs a differentiation on the drive signal supplied by the drive unit. The VGA circuit 282 includes a variable-gain resistor and can have a variable-gain capacitance for, respectively, setting the circuit gain and optimizing stability for the gain.

Depending on the nature of the drive signal supplied by the drive unit 260 (and hence also on the nature of the response signal generated by the sense unit 280), the touch device of FIG. 2A may also include: a peak detection circuit (not shown) which could also serve as a sample/hold buffer; and an associated reset circuit 326b operable to reset the peak detector. In most practical applications the touch device will also include a multiplexer between the signal generator 260 (FIG. 2B) and the touch panel 252, to permit the capability of addressing any one of a plurality of drive electrodes at a given time. In this way, a change in mutual capacitance occurs when the object (e.g., finger or conductive stylus) alters the mutual coupling between row and column electrodes, which are thereby sequentially scanned in response to multiplexed drive signals. Similarly, on the receive side, another multiplexer (224 of FIG. 2A) allows a single ADC unit to rapidly sample the amplitudes associated with multiple receive electrodes, thus avoiding the expense of requiring one ADC unit for each receive electrode. Element 212b shows several layers of similar circuits with multiple ADCs. This implementation has 5 such channels.

The above-discussed VGA circuit 282 of FIG. 2B provides an output, in the form of a differentiated signal that characterizes the response signal, to another amplification circuit shown in FIG. 2B that uses two stages. The first stage, depicted as an integrating amplifier 284, is configured and arranged to perform an integration on the differentiated signal representation of the response signals using the time-varying parameters to facilitate decimation at the transient portions for creation of nulls for odd harmonics of the RF signal. The integrating amplifier 284 amplifies, by integrating, the pulsed portions of the drive signals as characterized on their return (from the receive electrodes) in the response signals. A variable resistance circuit 286, at the front end input of the integrating amplifier 284, has a variation that is controlled to provide a time-varying change in gain synchronized with the drive signals. The variable resistance circuit 286 is controlled to provide a time-varying change in gain to the response signals to achieve this operation on the pulsed portions (corresponding to the drive signals). The amplification-integration operation is reset, using another control signal (not shown), which is synchronized with the timing of the corresponding drive signal to effect the proper repetition of the operation for each pulsed portion. This amplification serves to amplify the operative aspects of the response signals, while suppressing undesired noise, including the odd harmonics of the drive signal, carried by the response signals.

The integrating amplifier 284 provides an output that is capacitively coupled to the second stage 290 for further processing of the response signal. This further processing provides an integration, using operational amplifier 291, for combining the transient portions at the positive-going transitions and the negative-going transitions, for increasing signal strength and concurrently providing an effective common-mode suppression of noise, including even harmonics, by summing the positive and negative aspects (including the amplified transition portions) of the single-line differentiated response signal as processed from the output of the integrating amplifier 284. This integration by the second stage is thus repeated, by way of an integration-and-dump operation, to effect proper repetition of the operation for each pulsed portion as with the previously-discussed stage and with a similarly-controlled control signal (not shown) for integration reset.

The second stage 290 provides its output, through another capacitively-coupled path 292, to a multiplexer and ADC as previously described in connection with FIG. 2A. The capacitively-coupled path includes sample and hold circuitry (conceptually depicted by capacitance and switches) for preserving the analog characterization of each portion of the response signal, as processed by the second stage 290, which can be further processed through multiplexer 294 and ADC 296 for assessment by a controller or measurement circuit.

More specifically, the operational amplifier 291 is used to perform a summing operation to cause the positive and negative edge transitions to be combined for maximum signal strength and, ideally, the noise between these positive and negative edge transitions is canceled due to the opposite-phase summing as in common-mode suppression. As a specific implementation, this can be achieved by selecting, in response to clock phasing for the positive and negative edge transitions, either an inverting or non-inverting integrator (or integration operation) to subtract the negative edges from the positive edges. This summing integration thereby sums the positive and negative direction signals to provide a pseudo-differential signal that increases the signal amplitude 2× and reduces the common mode noise that is coupled into the sensor. A $V_{Bias}$ signal at one input to the operational amplifier 291, is set at a level to allow optimization of the output level along the capacitively-coupled path 292 for a sample-and-hold effect (S/H) for subsequent analog-digital conversion by the ADC 296. Using time-varying coefficients at front end of the first stage 284, the combination of the signal differentiation and the first stage of integration helps to reduce gain variation from the on-chip gain (provided by the resistive paths) and the slope of the TX (or drive) signal. Variation remains from on-chip integration capacitance ($C_{INT}$) and touch screen capacitance. The level of the drive signal helps to compensate for screen variation across different rows, where the capacitance ($C_{INT}$ of FIG. 2B) in the integration feedback path adjusts for variation across different receivers. The signal levels involved in this combined differentiation and integration can be estimated mathematically as follows:

$$I_{screen} = C_C \cdot dV_{TX}/dt$$

$$V_{DIFF} = I_{screen} \cdot R_{DIFF} = C_C \cdot R_{DIFF} \cdot dV_{TX}/dt$$

$$I_{INT} = V_{DIFF}/R_{INT}$$

$$= C_C \cdot (R_{DIFF}/R_{INT}) \cdot dV_{TX}/dt$$

$$dV_{INT} = (I_{INT}/C_{INT}) \cdot dt$$

$$dV_{INT} = dV_{TX} \cdot (C_C/C_{INT}) \cdot (R_{DIFF}/R_{INT}),$$

where the current sensed at the touch device is $I_{screen}$, the differentiated voltage signal is $V_{DIFF}$, and its integrated version is expressed as $dV_{INT}$.

Accordingly, the variable-gain amplification circuitry of FIG. 2B includes an integration circuit that uses the time-varying parameters to provide an integration-and-dump signal-filtering operation at the transient portions. This signal-filtering operation can be aided by decimation to a multiple of a clock rate used for sampling the response signals. The previously-discussed measurement circuit can then respond to the response signals, as processed via the variable-gain amplifier of FIG. 2B, by performing measurements on characterizations of the associated coupling capacitance and determining therefrom positions of touches on the touch surface. Using the signal-process teachings in Patent Document No. WO2010/138485 (PCT/US2010/036030) as a reference, this processing provides increased signal to noise with the increased TX drive levels and improved CRFI (conducted radio frequency immunity) and LCD (liquid crystal display) noise rejection with the improved RX receiver circuits. The overall power level and costs are also significantly reduced. For further/background information regarding the operation of a touch device in a similar environment, reference may be made to this above-noted Patent Document which is herein incorporated by reference for such teachings and those regarding front-end signal processing and timing and back-end (controller-based/measurement) response-signal processing.

In connection with specific experimental implementations of circuitry consistent with the circuitry of FIG. 2B, such integration on the differentiated signal representation of the response signals can be used advantageously to create nulls in the frequency response. Using such implementations, RF-signal noise especially the $3^{rd}$ and $5^{th}$ harmonics in the frequency response (per the integration of the differentiated signal representation) is filtered by way of such nulls. As described above, this RF-signal noise filtering can include both such odd harmonics as well as the interleaving even harmonics.

Figure 3A:
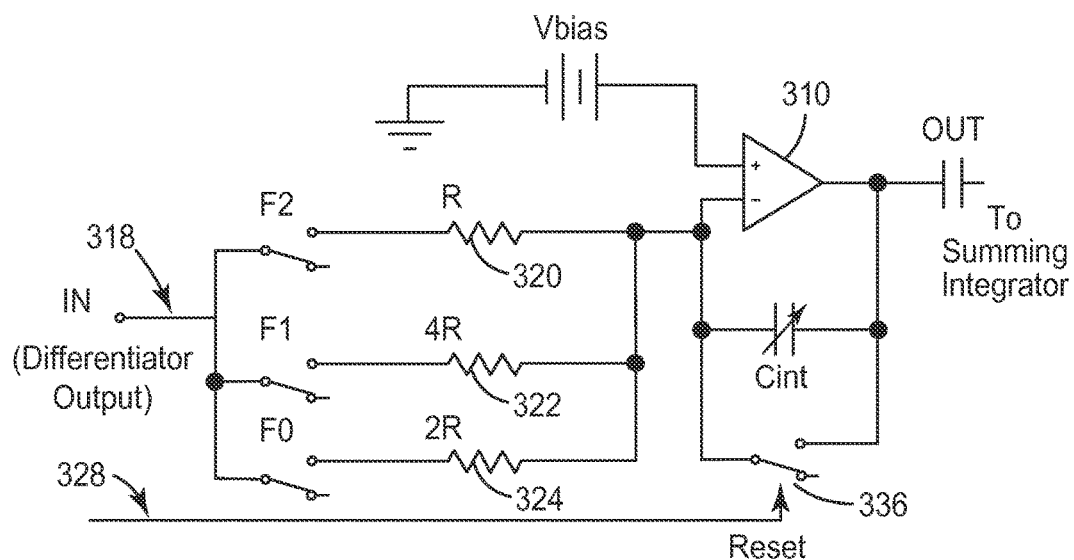
FIG. 3A is a schematic view of a portion of the circuit shown in FIG. 2B.
Figure 3B:
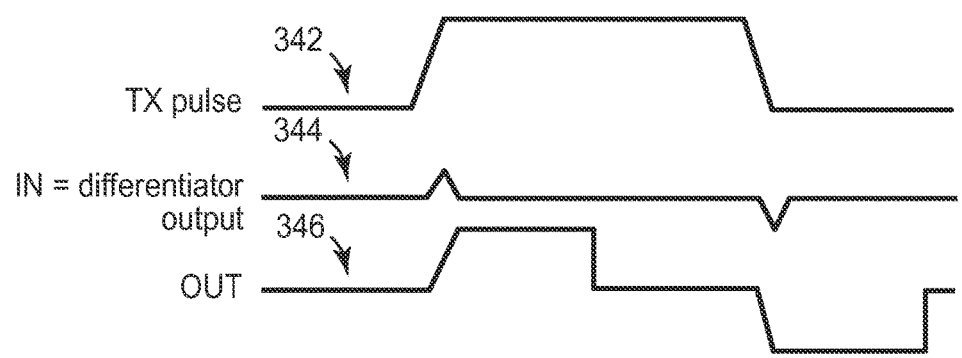
FIG. 3B is a timing diagram showing the processing of signals by circuitry shown in FIG. 2B and FIG. 3A.
Figure 3C:
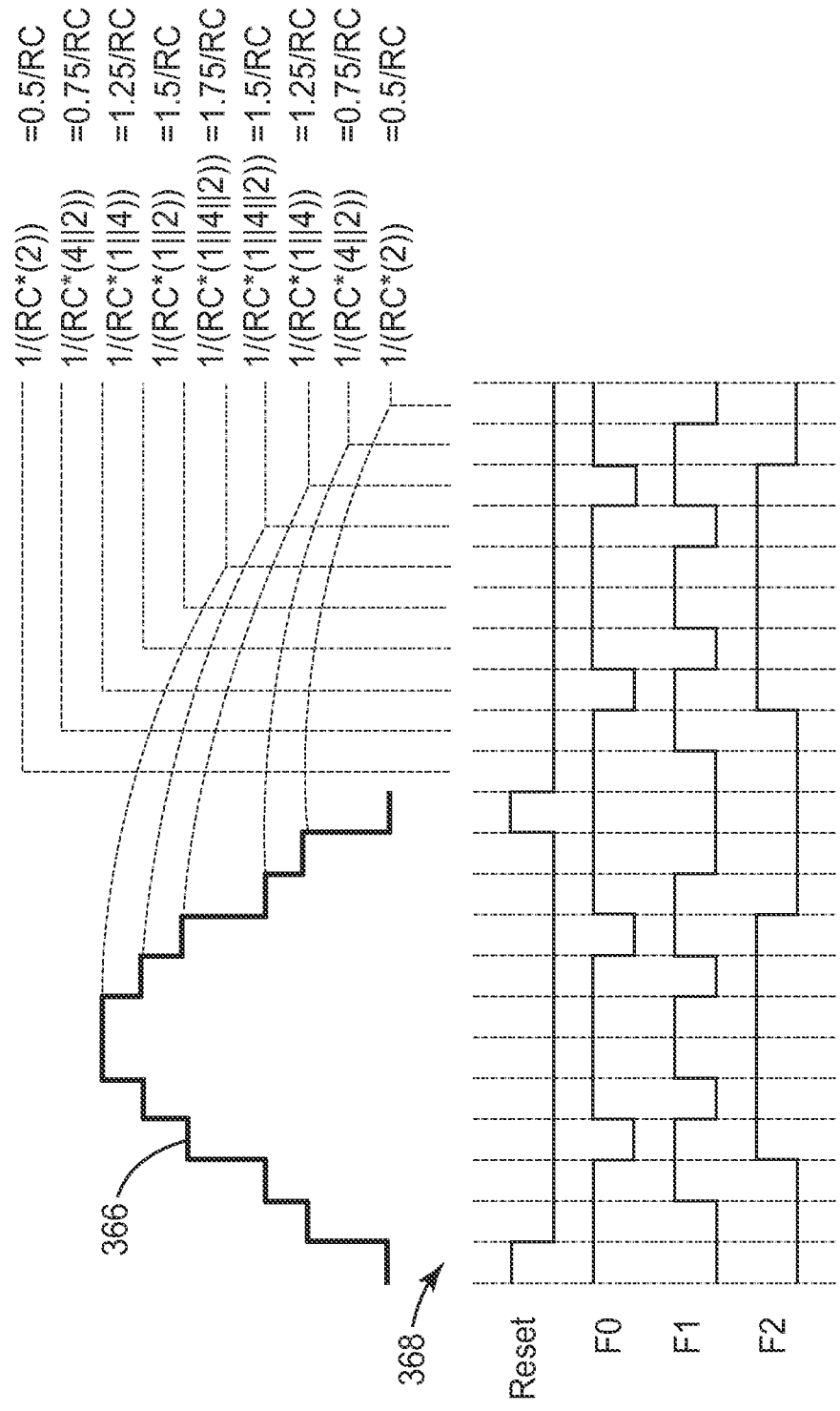
FIG. 3C is another timing diagram showing the processing of signals and circuitry shown in FIG. 2B and FIG. 3A.

FIGS. 3A, 3B and 3C provide further detail for an understanding of aspects pertaining to the first stage in FIG. 2B. These aspects are the variable resistance and timing involved with the integrating amplifier 284. For the specific example embodiment illustrated in FIG. 3A, the operational amplifier 310 includes a positive input port connected to voltage reference ($V_{Bias}$ as with the commonly-named signal in FIGS. 2A and 2B) and a negative input port arranged for receiving, as an input signal (at "IN" port 318), the output of the previous circuitry which is the (differentiation) circuit 282 of FIG. 2B. Corresponding to the variable resistance circuit 286 of FIG. 2B, the variable resistance shown in FIG. 3A is provided by three resistors arranged for connection in parallel paths: a first resistor (R) 320, a second resistor (4R) 322, and a third resistor (2R) 324. Values of at least two of the resistors may be different from each other. In each of the corresponding parallel paths are respective switches F2, F1, F0, one or more of which are selectively closed using control signals via path 328 (provided the controller and synchronized with the drive signal to effect the proper repetition of the operation for each pulsed portion). These selectable switches are denoted 330, 332 and 334, for respectively connecting one or more of resistors 320, 322 and 324, between the IN port 318 and the negative input port of the operative amplifier 310. A similarly-controlled switch 336 is also controlled, in a manner synchronized with the drive signal, to effect the reset timing coincident with the repetition provided for each pulsed portion.

The time constant of the integrating amplifier 310 may be adjusted with time such that reduced (or minimum) values of the time constant are substantially aligned with the positive and negative going transition portions of the response signal with greater values of the time constant aligned with portions of the response signal between the positive and negative going transition portions. The time constant may vary with time due to a time-varying resistance as described above and/or due to a time-varying feedback capacitance, Cint. Whether the resistance, the capacitance or both are vary with time to provide a time-varying time constant, the variation is synchronized with the drive signal.

This follows because the switches 330, 332 and 334 are used to define the RC time constant for the integration operation of the operational amplifier 310, where the R of the RC is the resistance provided by the parallel arrangement of resistors 320, 322 and 324, and the C of the RC is the capacitance provided in the negative feedback loop of the operational amplifier 310. Thus, table at the right of FIG. 3C shows the time constant inverse associated with exemplary time points of the timing diagram.

The input differentiator 282 with variable R gain settings outputs a bi-directional signal with inverted positive and negative impulse outputs. The feedback R allows the differential gain to be varied to maximize the RC differential impulse function output with the mutual Cc of the sensor.

The response signal may include even and or odd harmonics of the drive signal and reduction of these harmonics boosts the signal to noise ratio. The 1st integrator stage 284 shown in FIG. 3A comprises a bi-directional integrator with time-varying coefficients to integrate and dump a weighted average at each $V_D$ drive edge decimating to 2 times the sample rate. The coefficients of the bi-directional integrator of the first integrator stage 284 are selected to create nulls in the gain providing minimum or reduced gain near 3rd and 5th harmonics of the drive signal, $V_D$. The second summing integrator 290 sums the positive and negative filtered edge data from the first integrator 284. The summing integrator 290 subtracts the negative going transition portion of the response signal from the positive going portion of the response signal. Common mode RF noise, e.g., $2^{nd}$, $4^{th}$, and/or other even harmonics of the drive signal, are reduced or cancelled from the response signal in the summing integrator 290.

FIG. 3B is a timing diagram showing three signals 342, 344 and 346 relevant to the circuitry of FIG. 3A. The first signal 342 is the TX pulse, with one pulse of the pulsed signal driven onto the drive electrodes (e.g., as used in FIGS. 1A and 1B). The pulsed frequency of the TX pulse can vary; however, for many applications including those described in connection with FIGS. 1A and 1B, an 100 KHZ pulse is adequate, and with an 8 Mhz clock used to define the pulse timing for the TX pulse. The second signal 344, as presented at the IN port 318, is the single-line differentiated signal with an upwardly-directed impulse spike aligned with the illustrated positive slope of the TX pulse and with an downwardly-directed impulse spike aligned with the negative slope of the TX pulse. These are the differentiated transition portions, corresponding to the TX pulse edges, for which the sense circuitry monitors the response signals. As shown at the bottom of FIG. 3B, the third signal 346 corresponds to the output of the circuitry in FIG. 3A, which output is used to drive the second (summing-integrator) stage as shown at 290 of FIG. 2B.

FIG. 3C is another timing diagram showing how the selectable switches 330, 332 and 334 and the reset switch 336, can be controlled to effect a desired or optimal time-variable gain for circuitry shown in FIG. 3A. As illustrated in FIGS. 3A and 3C, each of the switches 330, 332, 334 and 336 is closed (conducting state) when the corresponding control signal for the switch is in a logic high state as shown in the timing diagram of FIG. 3C. For example, with each of the switches 330, 332 and 334 being in the closed state, the gain provided by the operational amplifier 310 of FIG. 3A is maximum, as illustrated by the center of the stair-step graph 366 at the top of FIG. 3C. Just after being reset at time point 368, the gain provided by the operational amplifier 310 of FIG. 3A is set by the switch 330 being in the closed state, and the switches 332 and 334 being in the open (nonconducting) state. This follows because the switches 330, 332 and 334 are used to define the RC time constant for the integration operation of the operational amplifier 310, where the R of the RC is the resistance provided by the parallel arrangement of resistors 320, 322 and 324, and the C of the RC is the capacitance provided in the negative feedback loop of the operational amplifier 310. Thus, table at the right of FIG. 3C shows the time constant inverse associated with exemplary time points of the timing diagram.

Figure 4:
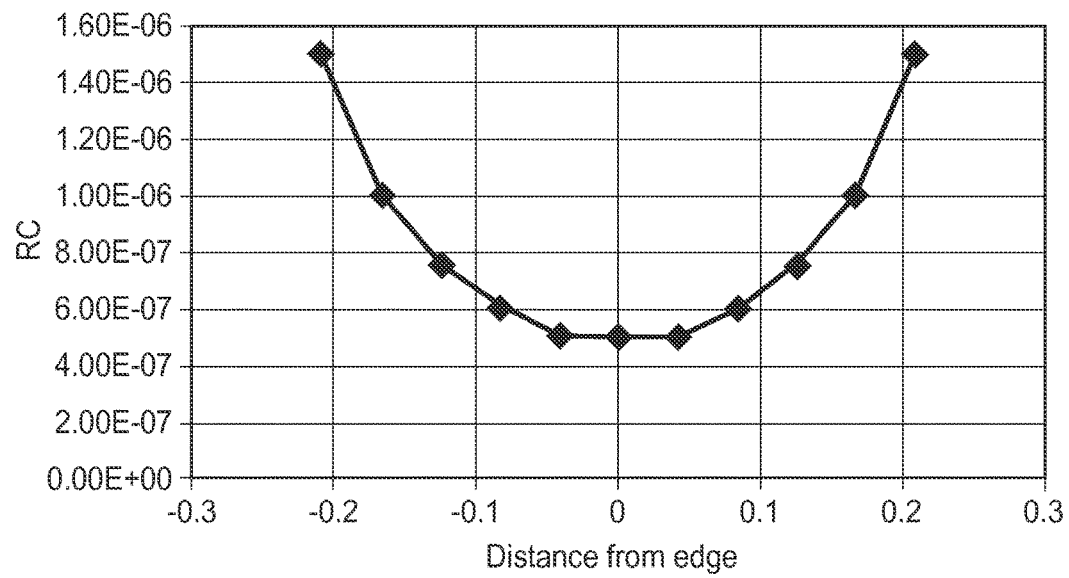
FIG. 4 is a time-based graph showing gain of amplification circuitry in FIG. 3A in terms of a variable-time constant.
Figure 5:
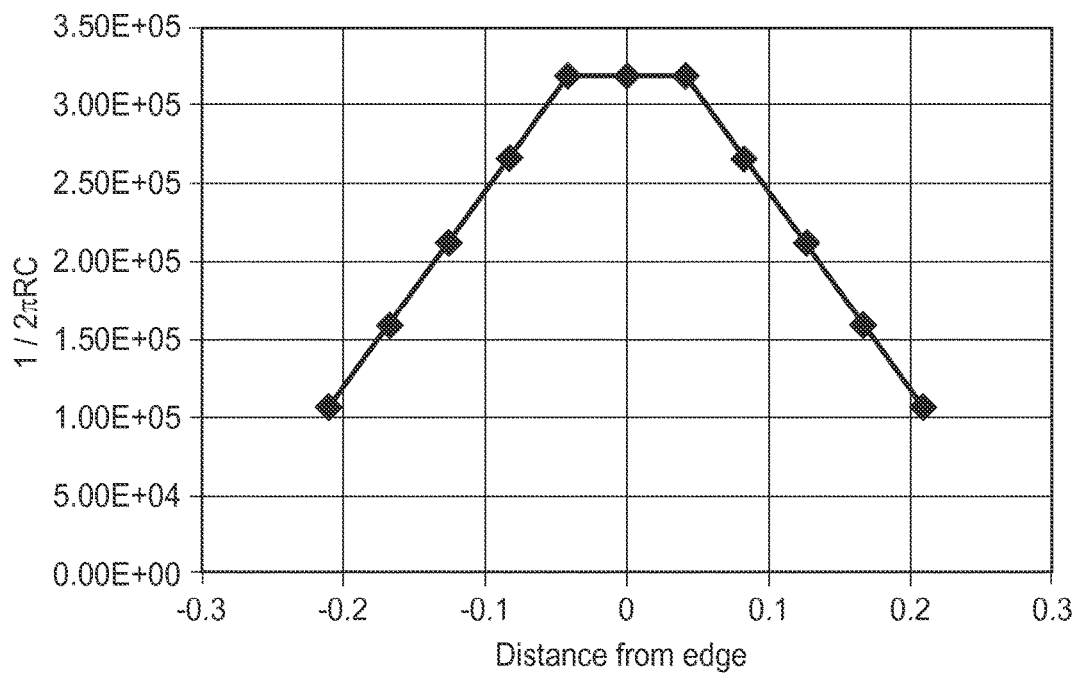
FIG. 5 is another time-based graph that shows gain of amplification circuitry in FIG. 3A in terms of frequency and as a function of the above-referenced variable-time parameter.

FIGS. 4 and 5 are time-based graphs for showing gain of the operational amplifier 310 of FIG. 3A in terms of a variable-time constant (FIG. 4) and in terms of the above-referenced variable-time constant (FIG. 5). The horizontal axis of each graph is a unit of time, shown linearly, corresponding to the distance from the edge of a pulse or spike as shown at signal 344 of FIG. 3B. The vertical axis of each graph shows the above-noted time constant (RC) in exponential units, with FIG. 5 showing time constant in terms of frequency ($1/(2RC \times 3.1456)$). As shown at the top of the plot in FIG. 5, with the switches closed, the corresponding resistors provide a minimal resistance to maximize the gain at point 0 along the horizontal axis (where the edge of the spike is sensed). It would be appreciated that the resistances and capacitance (for the RC) and timing can be adjusted as may be desired for the given application and clock timing, where the above-illustrated timing assumes an 8 MHz clock for the drive circuitry and related circuit timing and state machine timing with RF-noise filtering adjusted/optimized to lessen odd and even harmonics derived therefrom.

Figure 6:
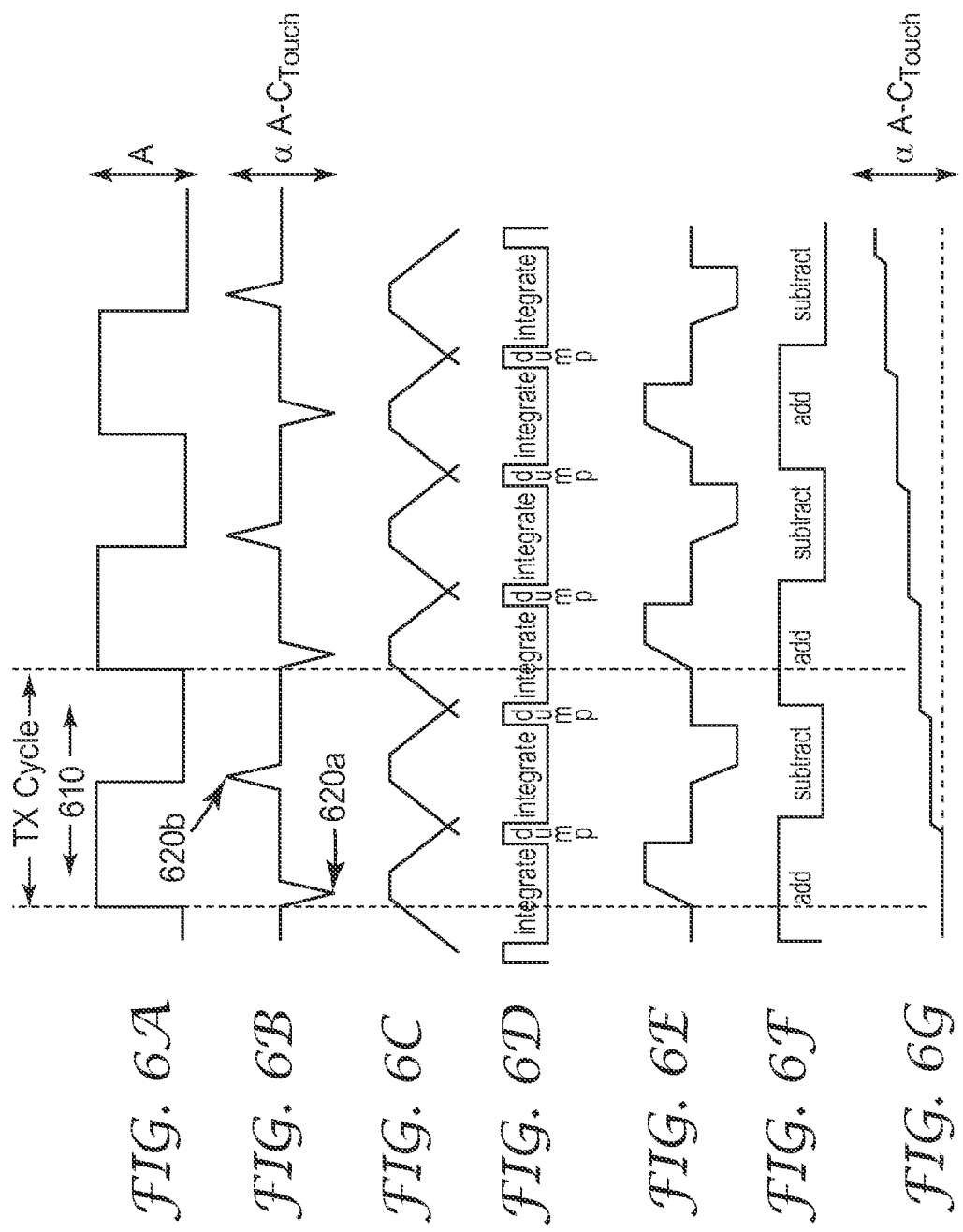
FIGS. 6A through 6G form parts of another time-based diagram showing signal timing of the last stage of integration of FIGS. 2B and 3A.

FIGS. 6A through 6G form parts of another time-based diagram showing examples of further signal timing relative to the stages of the circuitry illustrated in FIG. 2B. In FIG. 6A, the TX signal 610 is shown, with delineation of one cycle (or period), as it would appear on the drive electrodes of the previously-illustrated touch panels. After being passed along by the receive electrodes, the response signal is processed (differentiated) by a differentiator circuit (e.g., via the VGA circuit 282), to produce a differentiated form of the TX signal 610, as shown in FIG. 6B. With the exemplified TX signal 610 implemented as a square wave (a series of rectangle pulses), the differentiation operation produces impulse pulses including a negative-going impulse pulse (e.g., 620a) associated with each positive-going transition of the rectangle pulse and a positive-going impulse pulse (e.g., 620b) associated with each negative-going transition of the rectangle pulse. While the impulse pulses can become somewhat rounded due to the operational amplifier signal bandwidth and the RC filter effects of the touch screen, this derived form of the response signal is a differentiated representation of the drive signal.

FIGS. 6C and 6D show further processing of the response signal by the first and second stages of the sense unit (280 of FIG. 2B). FIG. 6C shows the gain aspect of the first stage as discussed above with FIGS. 4 and 5 (showing gain of the operational amplifier attributable to the first stage) and with the integration reset (in the feedback) centered between impulse pulses and with timing of the gain being adjusted/optimized by changing the RC time constant via the effective resistance as shown hereinabove (optionally, this change can also be implemented changing the effective capacitance). FIG. 6F shows a less-ideal characterization of the signal at the output of the first stage, with the gain being shown for the bi-polar (both positive and negative) aspects of the processed response signal. For certain implementations, this first stage might be deemed adequate as noise, including odd harmonics of the TX signal, between impulse pulses is significantly suppressed.

For other implementations, this first stage is complemented by the second stage (290 of FIG. 2B) which provides further noise filtering including suppression (nulling) of the even harmonics ensuing from the TX signal. Accordingly, the second stage further affects the response signal by performing an integrate-and-dump operation relative to the positive and negative transitions at the input of the second stage (as in FIGS. 6C and 6E). The dump aspect of the operation occurs at the low point of the signal shown in FIG. 6C, as controlled by a capacitance-shorting switch in the negative feedback loop of the operational amplifier 291 of FIG. 2B. The integration starts after each dump (or reset).

FIG. 6G illustrates the summing operation performed via the operational amplifier 291, whereby the positive and negative edge transitions are combined for maximum signal strength and, ideally, the noise between these positive and negative edge transitions cancel by the summing operation as in common-mode suppression.

Embodiments disclosed herein involve processing the response signal using a transfer function that is matched to the response signal. Matching the transfer function to the response signal may be achieved using a calibration circuit. A sense circuit (such as sense unit 280 shown in FIG. 2B) senses a response signal from the receive electrode that is responsive to a drive signal delivered to the drive electrode and possibly a touch input, if present. The sense unit applies a time-varying transfer function to the response signal. Application of the time-varying transfer function can be used to demodulate the information-carrying portion of the response signal from the carrier portion of the response signal, the carrier portion being responsive to the drive signal. Thus, in some implementations, the transfer function is referred to as the demodulation transfer function and in some implementations, the transfer function is referred to as a filter transfer function. In any case, the time-varying transfer function is substantially matched (correlated) to the response signal such that the transfer function varies proportionately and synchronously with the response signal. In some implementations, the touch sensitive apparatus further includes a touch circuit configured to process the output of the sense circuit to detect a presence and/or location of touch on the touch sensitive surface. In some embodiments, the system includes a calibration circuit configured to determine the time-varying transfer function that is matched to the response signal. The sense circuit may comprise an amplifier or differentiator, for example. In some implementations, the measurement circuit is arranged to apply the transfer function to a differentiated representation of the response signal.

In some implementations, a time-varying transfer function may be said to match the response signal if a cross-correlation between the transfer function and the response signal yields a correlation coefficient greater than about 0.5. In some configurations, the measurement circuit that applies the transfer function to the response signal may be implemented as a filter and/or as an amplifier having a time-varying gain. The processing may comprise an integrator having a time-varying gain. For example, the integrator may have a time-varying RC constant, e.g., due to a time-varying gain capacitor and/or a time-varying gain resistance. In some implementations, the measurement circuit may comprise a differentiator with a time-varying gain.

Figure 7:
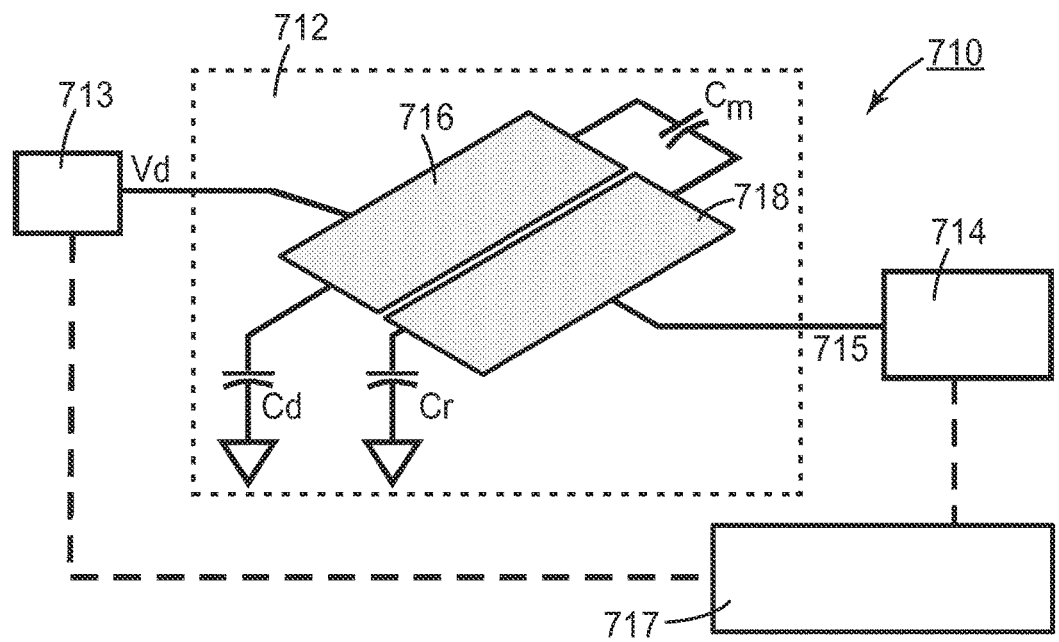
FIG. 7 shows a simplified schematic of an exemplary touch sensitive apparatus configured for measuring mutual capacitance Cm between two electrodes of a touch panel.

FIG. 7 shows a simplified schematic of an exemplary touch sensitive apparatus 710 configured for measuring mutual capacitance Cm between two electrodes 716 and 718 of touch panel 712. Drive circuitry 713 applies drive signal $V_D$ to driven electrode 716, and sense circuitry 714 receives a signal 715 from receive electrode 718. The response signal 715 may be used to calculate Cm or changes in Cm. Control circuitry 717 controls the functions and timing of the measurement circuit 714 and/or drive circuitry 713, and may further process signals received from measurement circuit 714.

Devices for measuring capacitance can take the form of capacitive input (for example, touch) devices such as buttons and switches, linear sliders, and matrix touch panels, as well as sensors for detecting the presence or amount of a substance positioned proximate the electrode, or a digitizer for capacitive detection of a stylus. In each of these situations, at least one unknown mutual capacitance (denoted Cm herein) results from coupling between electrodes, and second and third unknown capacitances (denoted Cd and Cr herein) results from coupling between driven electrode Cr and ground, and receive electrode Cr and ground. Cm, Cd and Cr change when an object or substance comes into proximity with the electric field generated when AC voltages are applied to at least one of the electrodes. This change may be used as a basis for identifying a touch or the presence of an object. Cm, Cd, and Cr are a simplified model of electrodes that typically have distributed resistance and capacitance that varies according to the shape of electrodes and the materials of which they are made.

The present disclosure describes circuitry and methods for measuring parameters of these capacitances and most particularly methods for measuring changes in Cm. In some embodiments, the sense circuit comprises a differentiator and a time-varying gain. In some embodiments the measurement circuit is configured to multiply the response signal by a time-varying transfer function and to integrate the product of the multiplication over a period of time, e.g., an integer number of cycles of the response signal. The transfer function and the response signal may be digitized before the multiplication and/or integration such that the transfer function and response signal comprise a number of discrete values. Alternatively, the sense circuit may include an analog multiplier circuit and/or an analog integrator configured to integrate an output of the analog multiplier circuit. In this example, the sense circuitry can include an analog to digital converter configured to digitize an output of the integrator.

Figure 8:
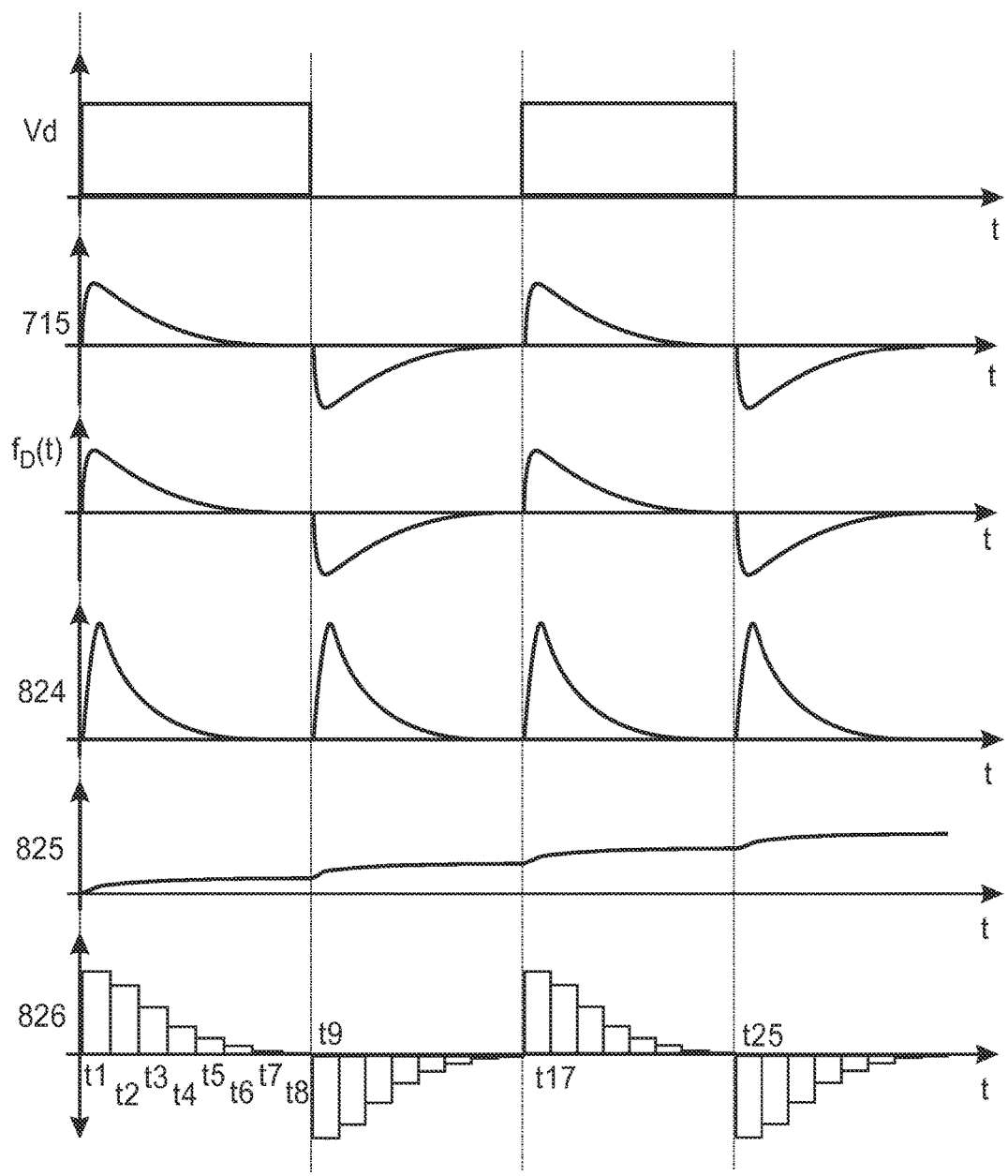
FIG. 8 shows a graph comprising an exemplary set of signals and transfer functions vs. time, according to some embodiments.

FIG. 8 shows graph 820 comprising an exemplary set of signals and transfer functions vs. time, according to some embodiments. The drive signal comprising a square wave, $V_D$, is applied to driven electrode 716 by drive circuit 713 (see, FIG. 7). Signal 715 is approximately a differentiated version of the drive signal $V_D$. This exemplary scenario may be present in the case where the input impedance of measurement circuit 714 is non-capacitive and low compared to the impedance of capacitances Cm and Cr. The principles and methods described in terms of this example herein apply for other waveforms as well. Demodulation transfer function fD(t) synchronously demodulates signal 715. Signal 824 results from this demodulation (i.e. the application of demodulation transfer function fD(t) to signal 715). Mathematically, demodulation is accomplished by multiplying signal 715 by transfer function fD(t), resulting in signal 824. Signal 825 represents the integration of signal 824 over a period of time, such as an integral number of cycles of signal 715.

Functionally, there are a number of methods of demodulating signal 715 with demodulation transfer function fD(t). In a digital processing embodiment, signals 715 and fD(t) may be converted to digital format with digital numbers representing values of 715 and fD(t) at sequential discrete times. For example, signal 826 represents a digitized version of transfer function fD(t), having eight discrete values during the time periods t1-t8. Signal 715 and transfer function fD(t) may be represented as two vectors comprising a (equal length) series of values at discrete sequential times. The resulting scalar product of the two vectors may be calculated, and a series of such products may be added to perform the integration function shown as signal 825.

Figure 9:
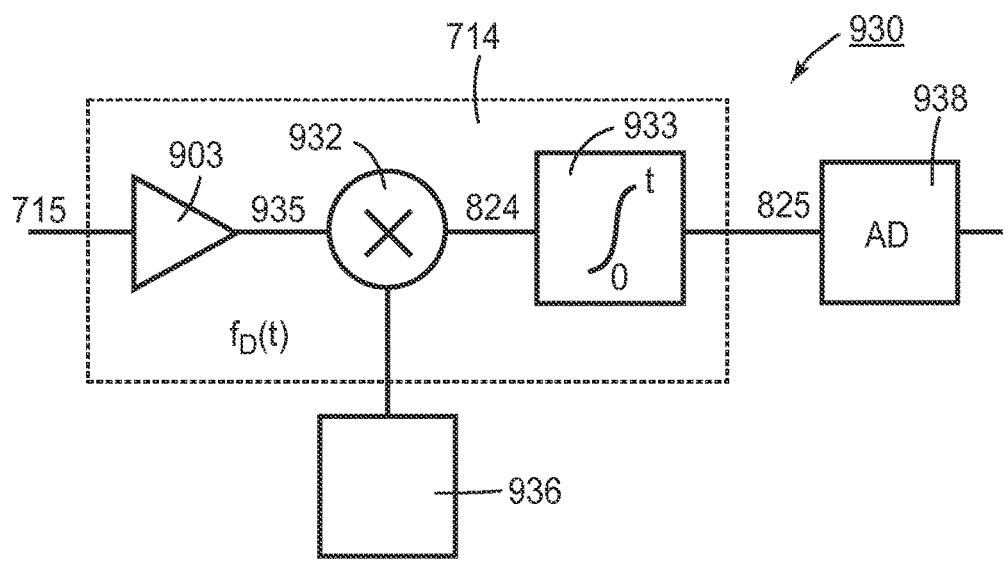
FIG. 9 shows an embodiment of measurement circuit in accordance with some embodiments.

FIG. 9 shows an embodiment of measurement circuit 714, wherein signal 715 is first processed by amplifier 903. Amplifier 903 may provide a low impedance at its input, for example a summing junction, and it may amplify the magnitude of signal 715. The resulting signal 935 is demodulated by multiplying it by time-varying demodulation function fD(t) from time-synchronous source 936. In one embodiment, signal 935 may have the shape of signal 715 (see, FIG. 8) and multiplication function 932 may be an analog multiplier circuit, where fD(t) may have a waveshape of signal 935 (without the real-time noise present on signal 935). Finally, the integrated signal 825 may be converted to digital format by analog to digital converter (ADC) 938. Signal source 936 and ADC 938 may be incorporated in sense circuitry 714 in some embodiments.

In another embodiment, function 932 may be configured to multiply analog signal 935 by a digital fD(t) signal. In the digital fD(t) approach, signal 935 is multiplied in real time by a time-varying digital value. Signal 826 (FIG. 8) is a digital representation of signal fD(t), where signal fD(t) has been quantized into e.g. eight values over eight periods of time. Each of the eight values may be represented by a digital number, and each digital number may be applied to a multiplying digital to analog converter at the appropriate time as signal 715 is received, as previously described.

According to some embodiments, demodulation transfer function fD(t) may have substantially the same shape as response signal 715, resulting in matched filtering of signal 715. For this reason, function fD(t) (and function 826) are shown in FIG. 9 with approximately the same shape as function 715.

Figure 10:
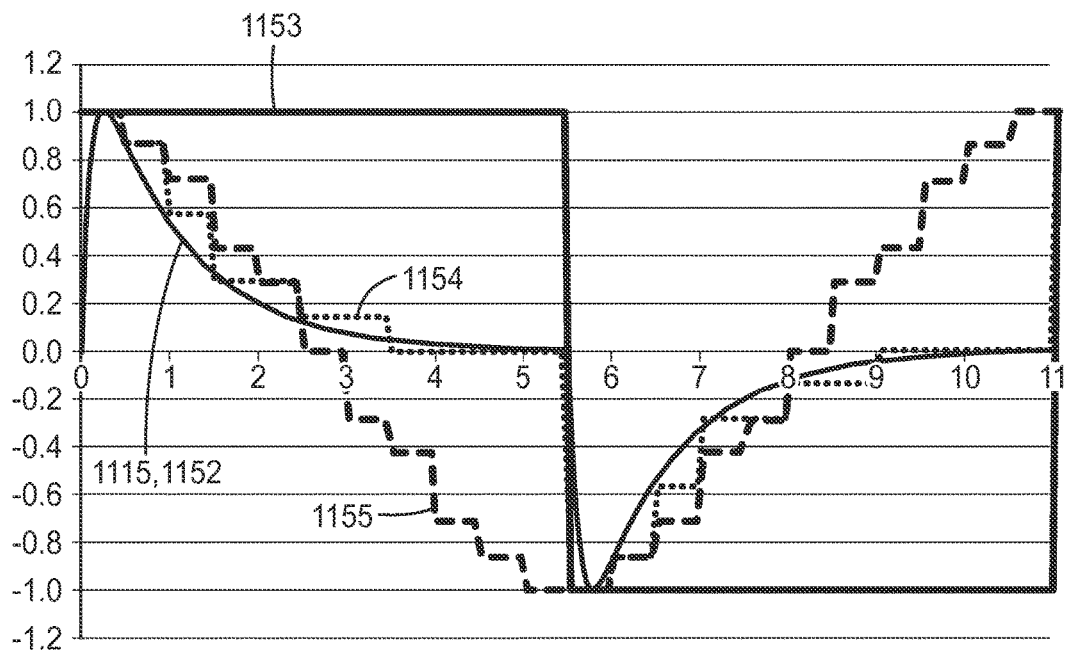
FIGS. 10 and 11 shows a single cycle of a response signal, and four alternative fD(t) demodulation transfer functions that may be used to synchronously demodulate the response signal.

FIG. 10 shows a single cycle of response signal 715, and four alternative fD(t) demodulation transfer functions that may be used to synchronously demodulate signal 715. Function 1153 is a square wave. Function 1154 is a multi-level quantized waveshape that approximates the shape of signal 715. Function 1155 is a multi-level quantized waveshape that approximates the shape shown in FIG. 3C. FIG. 10 appears different from FIG. 3C because FIG. 10 combines the waveform of FIG. 3C plus the periodic inversion of FIG. 3C that is indicated by the alternating add, subtract function shown in FIG. 6F. The fourth demodulating function 1152 has the same shape as a noise-free signal 715.

Simulations were performed whereby noise of various frequencies was added to signal 715, and the resulting noisy signal was synchronously demodulated using each of the four demodulation functions 1152, 1153, 1154, and 1155. Demodulated signals were then integrated over a period of four cycles of signal 715, (four signal wavelengths). In the examples shown, the signal wavelength is 11 µsec, so demodulated signals were integrated for a period of 44 µsec. Signal 715 was simulated by subtracting a normalized exponential waveform with time constant of a first time constant (e.g. 0.1 µsec) from a normalized exponential waveform with a second time constant (e.g. 1 µsec). In these simulations, the noise divided by signal, (N/S) is calculated by subtracting the known demodulated signal level from the demodulated (signal+noise) level, then dividing by the demodulated signal level. The result is the inverse of the more commonly used signal/noise (S/N) level. N/S was used here because graph scaling is more manageable, particularly at frequencies where noise approaches zero level.

Figure 12A:
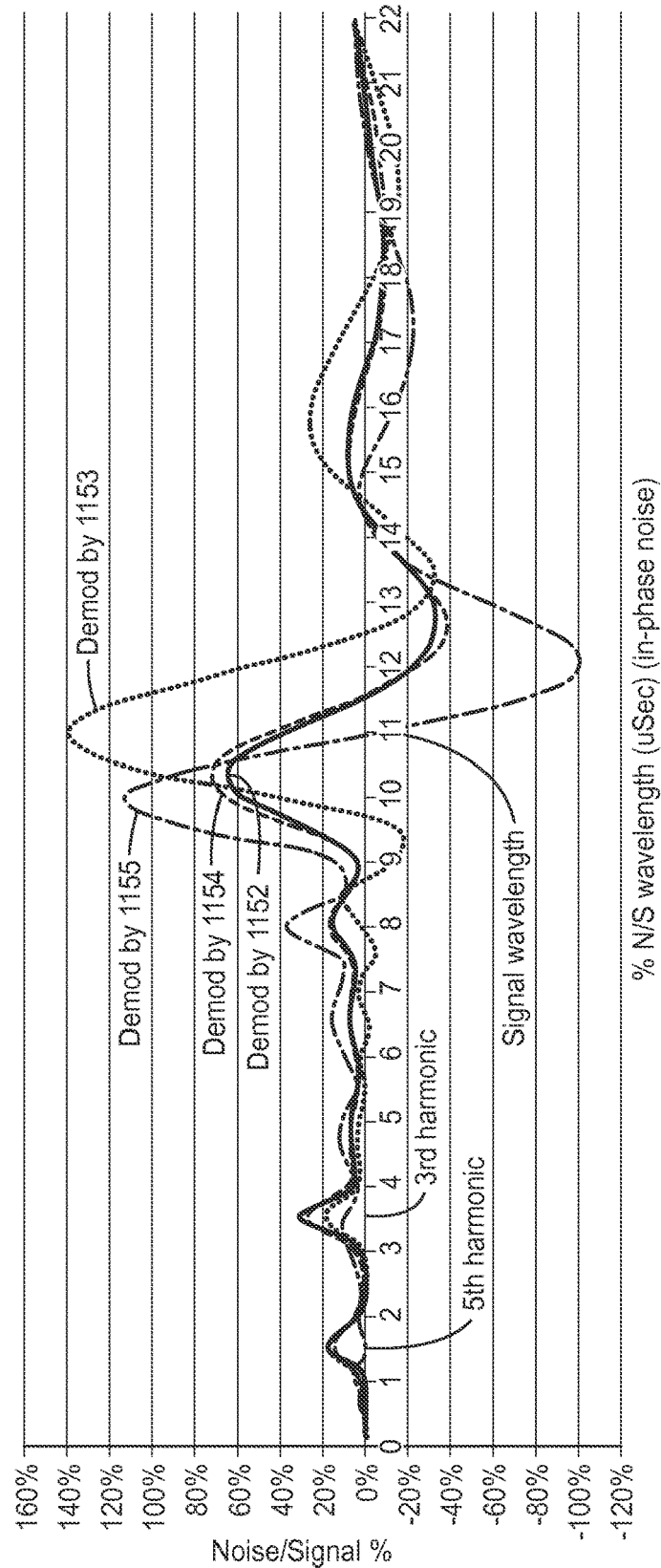
FIGS. 12A, 12B, and 12C provide graphs of Noise/Signal % vs. noise wavelength for four exemplary demodulation transfer functions.
Figure 12B:
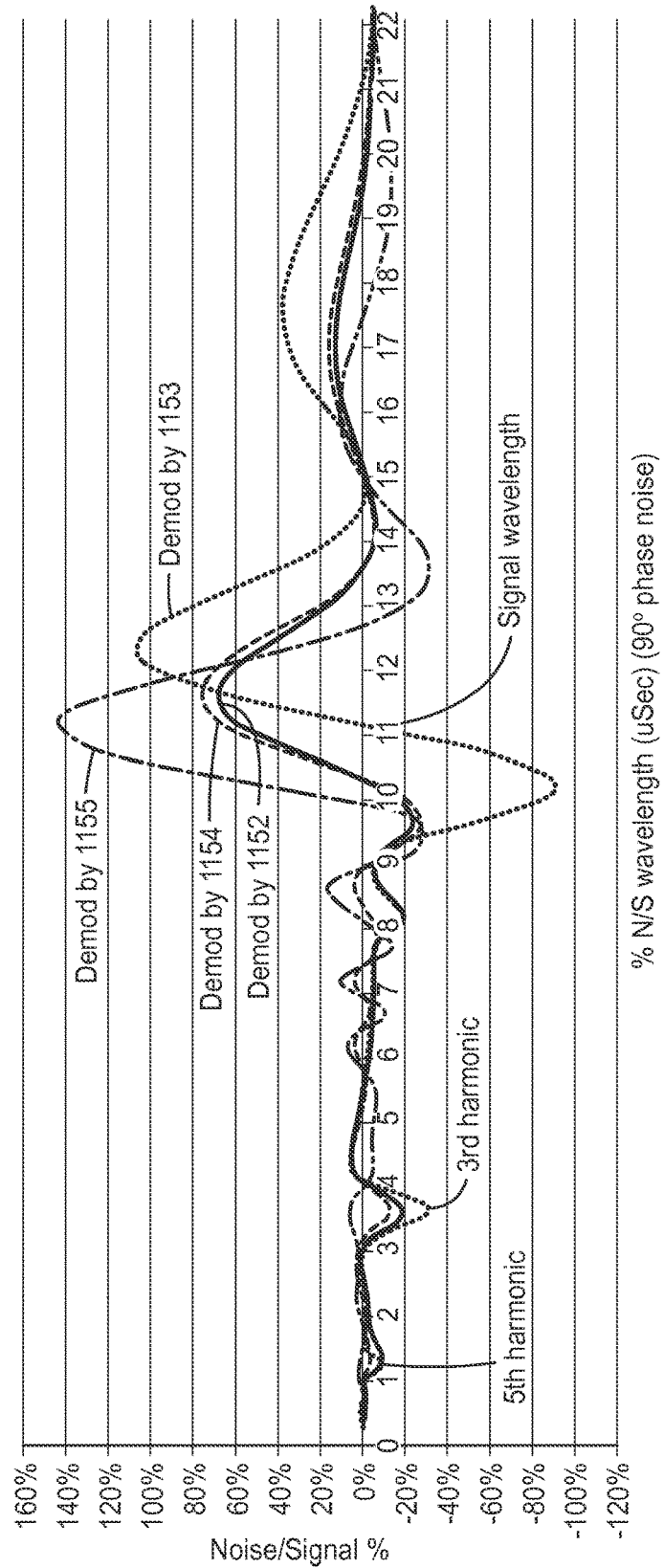

FIGS. 12A and 12B show graphs of percentage demodulated N/S. For these measurements, noise of a single sine wave frequency was added to signal 715 and the percent change in demodulated and integrated measurement was calculated. Peak noise magnitude is 50% of the peak value of signal 715 and integration was performed over four cycles of signal 715. FIGS. 12A and 12B differ in the phase of the noise relative to signal 715. In FIG. 12A, phase of noise sine waves is aligned with signal 715. In FIG. 12B, phase of noise sine waves leads signal 715 by 90 degrees.

Figure 12C:
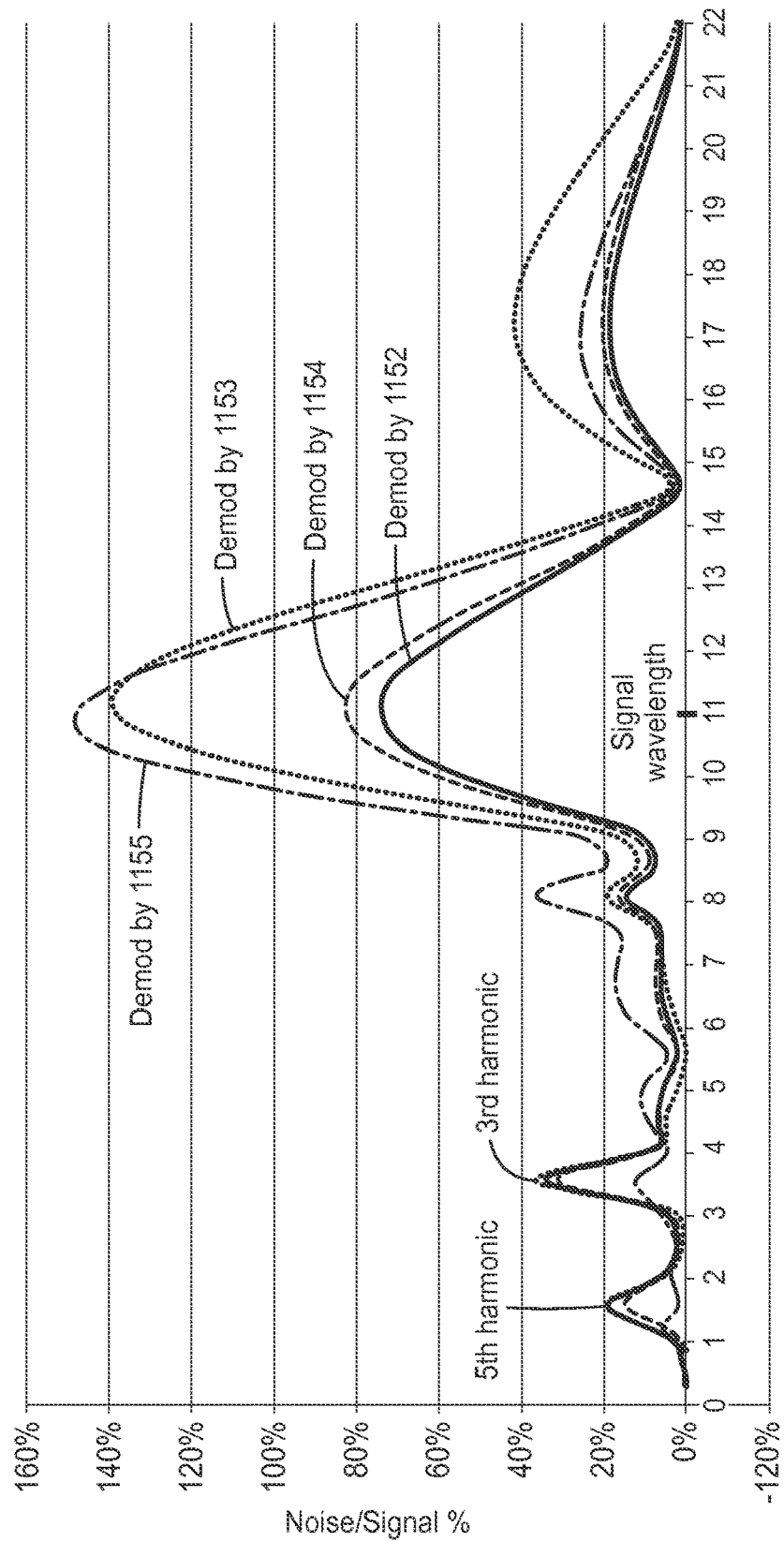

FIG. 12C shows the vector sum of 0 degree noise (FIG. 12A) and 90 degree noise (FIG. 12B). Thus, FIG. 12C shows the magnitude of noise across a range of wavelengths, centered on the signal wavelength of 11 µsec. FIGS. 12A, 12B, and 12C show that performance of the four exemplary demodulation transfer functions varies significantly with frequency and phase of noise. Overall, the matched and near matched demodulation signals 1152 and 1154 have superior performance in the presence of noise, other than odd harmonics.

Some embodiments involve calibrating the transfer function of the demodulator to substantially match the response signal. The shape of signal 715 varies with the shape of drive signal $V_D$, the parameters of sensor 712, and the parameters of components within measurement circuit 714. Typically, variations among sensors due to size and construction may cause significant variations in signal 715. Thus it is advantageous to measure the shape of signal 715 and to demodulate signal 715 with a near-matching demodulation function. In digital processing systems where measurement circuit 714 comprises circuits for digitizing signal 715 at a fast rate, the shape of signal 715 may be directly measured by fast analog to digital conversion.

Measurements during calibration may be less time-critical than measurements during normal use of a system, so noise of calibration measurements may be reduced by measurement over more cycles of signal 715 than are normally used. Also, it may be possible to reduce noise by turning off non-critical noisy functions during calibration. Drive signal $V_D$ may be turned off during calibration so ambient noise may be measured directly, and noise measurements may be subtracted from the levels of a noisy signal to yield an approximation of a noise-free signal shape.

Figure 11:
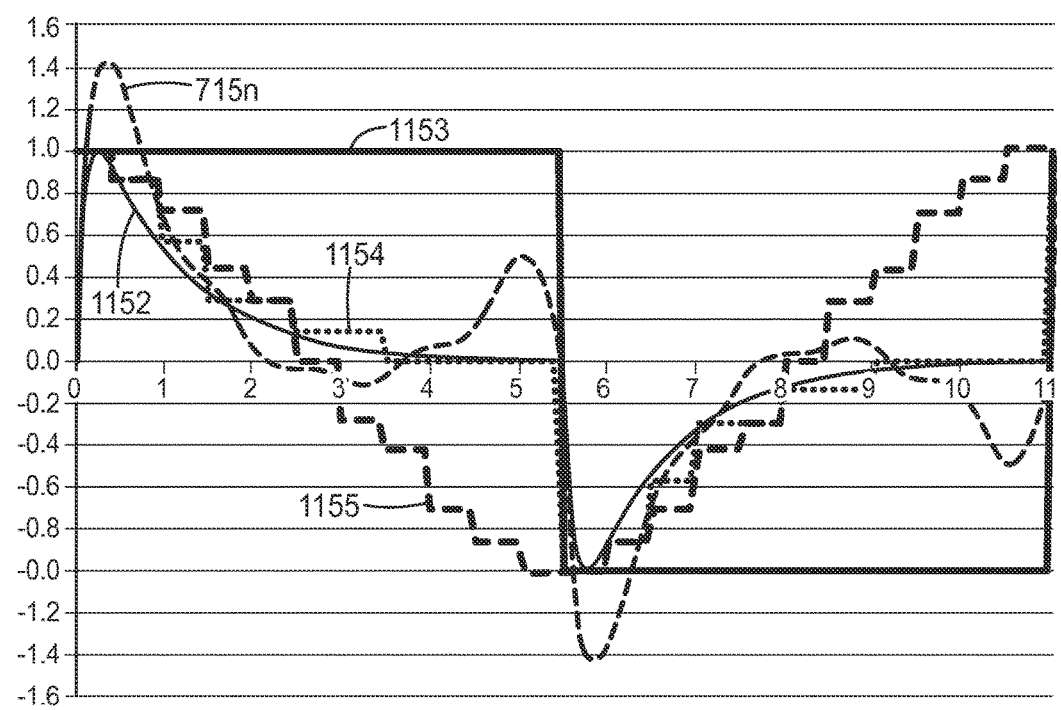

As stated above, signal 715 may be the result of a square wave driven signal applied to a capacitive sensor, passing through a sensor capacitance Cm that is sometimes modified by a touch. Harmonics of the driven signal may reach the measuring circuits by paths other than Cm, in which case these harmonics are substantially noise. Or, noise may come from a switching power supply that also generates square waves. Odd harmonic noise was simulated by adding square wave (odd) harmonics to signal 715, comprising 21% 3rd harmonic, 13% of 5th harmonic, 9% of 7th harmonic, and 7% of 9th harmonic. The peak level of these combined harmonic signals was normalized to 50% of the peak magnitude of signal 715. The resulting noisy signal 715n is shown graphically in FIG. 11.

The simulated results of demodulation and integration for 4 cycles of signal 715n are shown in column 3 of Table 1. Calculated percent N/S ratios are shown as percentages in column four of Table 1. Various demodulation functions result in different integrated results as shown in Table 1. The "0 Noise" column of Table 1 shows integrator levels after four cycles of demodulation of signal 715 with various demodulation signals, and no noise. Matched filters 1152 and 1154 reduce the odd-harmonic noise content of the signal more than square wave 1153, but signal 1155 substantially eliminates odd harmonics. This is because filter 1155 is matched to the odd-harmonic noise, but is in quadrature phase with the noise, so filter 1155 has near-zero correlation with odd harmonic noise, resulting in essentially no noise demodulated in the example of signal 715n.

TABLE 1

|  | 0 Noise | Signal 715n | Noise/Signal % |
|---|---|---|---|
| Matched demod (52) | 97 | 131 | 35.7% |
| Quantized matched (54) | 120 | 157 | 30.8% |
| Quantized 71504US (55) | 114 | 114 | −0.3% |
| Square demod (53) | 164 | 228 | 38.9% |

Figure 13:
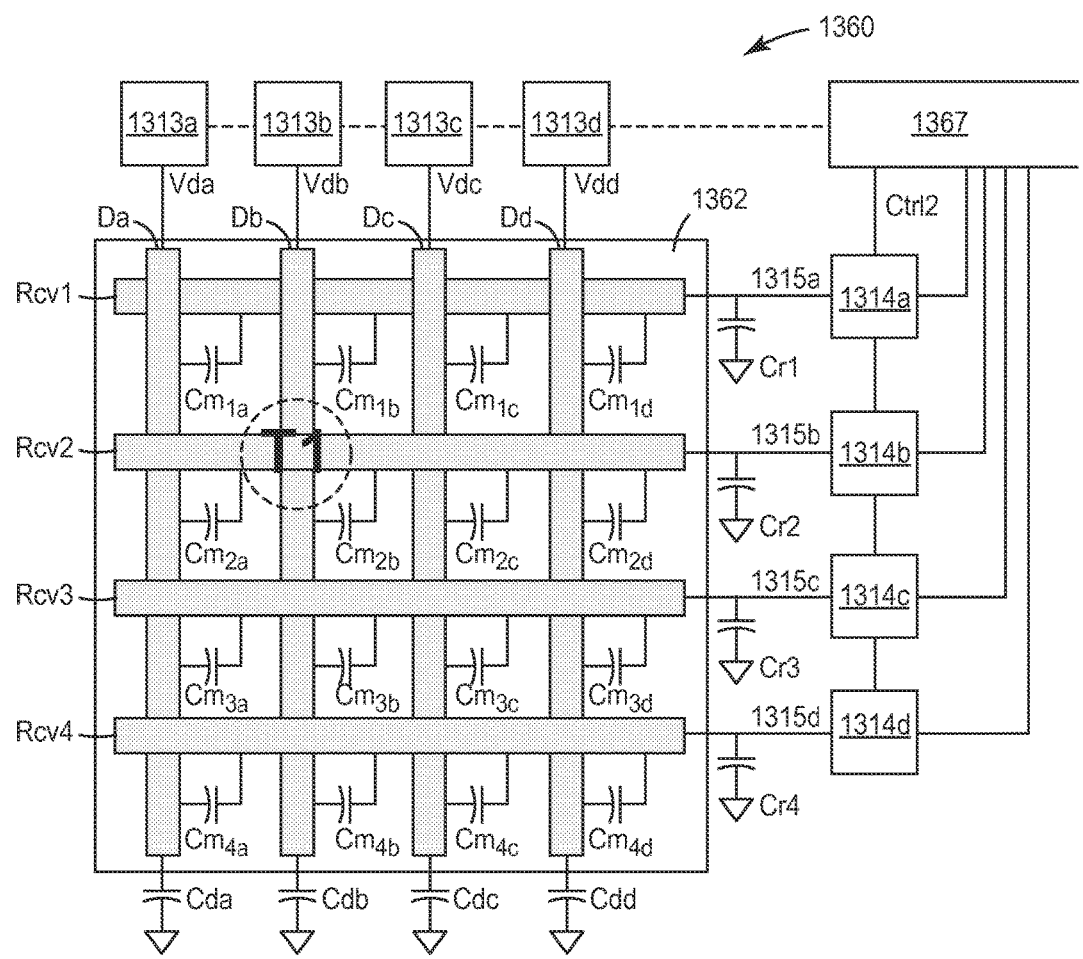
FIG. 13 shows a capacitance touch digitizer system comprising a matrix of electrodes.

FIG. 13 shows a capacitance touch digitizer system 1360 with components and characteristics similar to system 710, but system 1360 comprises a matrix of electrodes. Sensor 1362 comprises two arrays of electrodes arranged one above the other. The top electrode array comprises parallel receive electrodes Rcv1, Rcv2, Rcv3, and Rcv4. The lower array includes parallel driven electrodes Da, Db, Dc, and Dd; arranged orthogonal to electrodes Rcv1, Rcv2, Rcv3, and Rcv4. Sixteen inter-electrode (mutual) capacitances Cm are typically approximately equal. Drive circuits 1313a, 1313b, 1313c, and 1313d generate signals $V_{Da}$, $V_{Db}$, $V_{Dc}$, and $V_{Dd}$ which may be any waveshape, though pulses are used in the examples herein. Receive circuits 1314a, 1314b, 1314c, and 1314d measure response signals 1315a, 1315b, 1315c, and 1315d respectively. Results of measurements are conveyed to sense, measurement, and/or control circuits 1367. In analog-processing embodiments of the invention, receive circuits 1314 may perform transfer functions comprising one or more of synchronous demodulation, integration, and analog to digital conversion of signals 715a-d. In digital processing embodiments of the invention, receive circuits 1324 may amplify and they may convert signals 715a-d from analog to digital format for processing in circuits 1367.

Drive circuits 1313 and receive circuits 1314 are controlled by circuit 1367 via control lines Ctrl1 and Ctrl2.

A user interacts with the sensor by touching the touch surface (not shown) situated above the top array. A touch in proximity with an electrode intersection will change one or more of inter-electrode capacitances Cm. The inter-electrode capacitance(s) proximate to a touch is reduced in magnitude, becoming unequal with other inter-electrode capacitances. In most matrix touch systems, a touch affects more than one inter-electrode capacitance Cm, so interpolation may be used to refine touch locations.

In the case of matrix touch systems as exemplified by FIG. 13 and elsewhere herein, driven signals Da, Db, Dc, and Dd are typically driven one at a time, sequentially. Signals 1315a, 1315b, 1315c, and 1315d may be received by multiple measurement circuits 1314a, 1314b, 1314c, and 1314d simultaneously, and each receive channel may perform a demodulation transfer function fD(t) and integration of separate response signals 1315a, 1315b, 1315c, and 1315d simultaneously.

Sensor 1360 has a complex array of distributed capacitances and resistances. Drive electrode capacitances Cd are shown as a single capacitance to ground on each electrode, but in practice Cd is generally distributed along each electrode. Likewise each receive electrode has capacitance Cr distributed along its length. Resistance of electrodes (not shown in system 1360) may vary from hundreds of ohms to tens of thousands of ohms, so response signals will be attenuated different amounts depending on the length of the signal path through drive and receive electrodes.

Receive signals may be subject to at least two major variations. First, receive signals may vary together in proportion to the distance of a driven electrode from the receive electrodes. For example, when distant electrode Da is driven with a signal, all four receive signals can all be lower than when nearby electrode Dd is driven. Likewise, driven signals Da-Dd may be largest at the driven end, and attenuated as they reach the distal end of driven electrodes Da-Dd. Response signals can vary from one another in proportion to their proximity to the driven end of drive electrodes. For example, response signal 1315a (attached to electrode Rcv1) will be greater in magnitude than signal 1315d because drivers 1313a-1313d apply their signals closer to electrode Rcv1.

Thus the shape (and/or size) of each response signal may vary depending on which driven electrode is activated. Such variations may be measured by the calibration processes described herein, and a unique demodulation transfer function fD(t) may be used for each driven electrode. Likewise, each of the receive measurement circuits 1314a-1314d may use a demodulation transfer function fD(t) that differs from the other measurement circuits.

Figure 14:
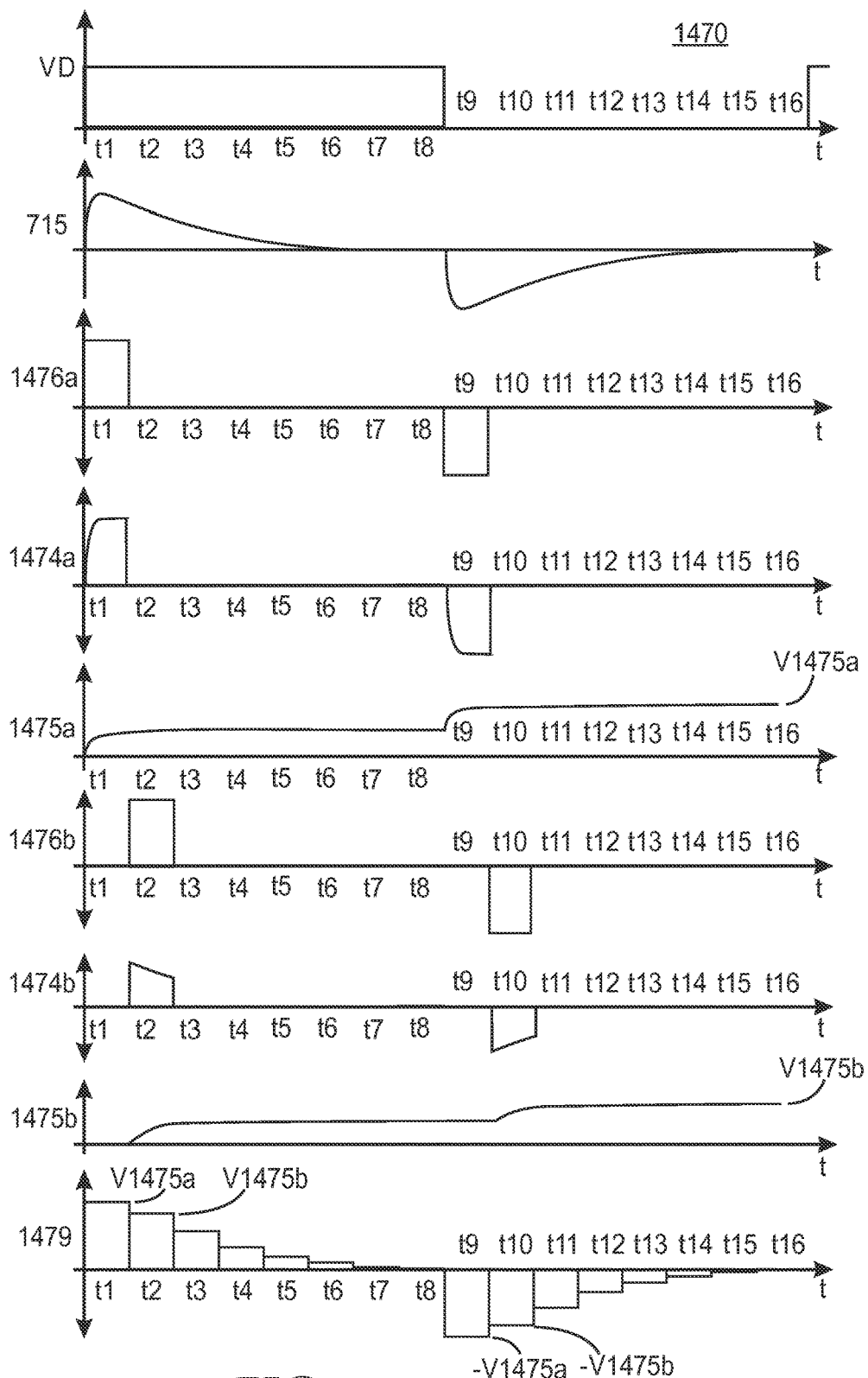
FIG. 14 shows exemplary graphs including one cycle of a drive signal $V_D$ and a response signal.

Some analog-processing circuits such as the analog/digital hybrid circuit of FIGS. 2A and 2B are also suitable for measuring the shape vs. time of a received waveform, by using the demodulation circuitry for sampling of signal 715. A method of measuring with this analog circuit is described in reference to FIG. 14. FIG. 14 shows exemplary graphs 1470 including one cycle of drive signal $V_D$ and response signal 715 produced as described above. In the example shown, a series of demodulation sampling pulses will be used to sample signal 715 at a series of eight discrete times. First, pulse 1476a is used as a transfer function fD(t) (corresponding to fD(t) of system 1030, FIG. 10), to demodulate only the portion of signal 715 that occurs during time t1 and t9. Signal 1476a comprises a pair of opposite-polarity sample times separated by ½ wavelength of signal 715. The result is signal 1474*a*, (corresponding to signal 1024 of system 1030) which is integrated to yield signal 1475*a* with final value of V1475*a*. FIG. 14 shows integration over one full cycle of $V_D$, but in practice, integration is preferably performed over many cycles of $V_D$. The value of signal 1475*a* at the end of integration is proportional to the average value of signal 715 during the sample time periods t1 and t9.

Next, pulse 1476*b* is used as a transfer function f(t) to demodulate only the portion of signal 715 that occurs during times t2 and t10. The result is signal 1474*b*, which is integrated to yield signal 1475*b*. The value of signal 1475*b* at the end of integration is V1475*b*, which is proportional to the average value of signal 715 during the time period t2 and t10. This process may continue until the value of signal 715 at every time period (t1 and t9 through t8 and t16) is known. In the example of graphs 1470, eight integrations are performed to measure the eight pairs of opposite-phase samples, (t1 and t9, t2 and t10, t3 and t11, etc.). After the magnitude of signal 715 is measured at eight sample points, a demodulation transfer function fD(t) may be generated using these eight values, (and their opposite phase compliments). For the example given, the result will be calculated transfer function 1479, where eight values and their compliments form a transfer function that approximates signal 715.

The process of measuring signal 715 is preferably performed during a calibration process done prior to normal use of the system. The calibration process allows the measurement system to adapt to variations in the form and magnitude of response signal 715 from various causes. If there are controllable noise sources that may interfere with this calibration process, they may be turned off during calibration. For example, a nearby display and/or non-essential power supply may be turned off, especially if these components emit noise that is synchronous to the capacitance measurement system.

Figure 15A:
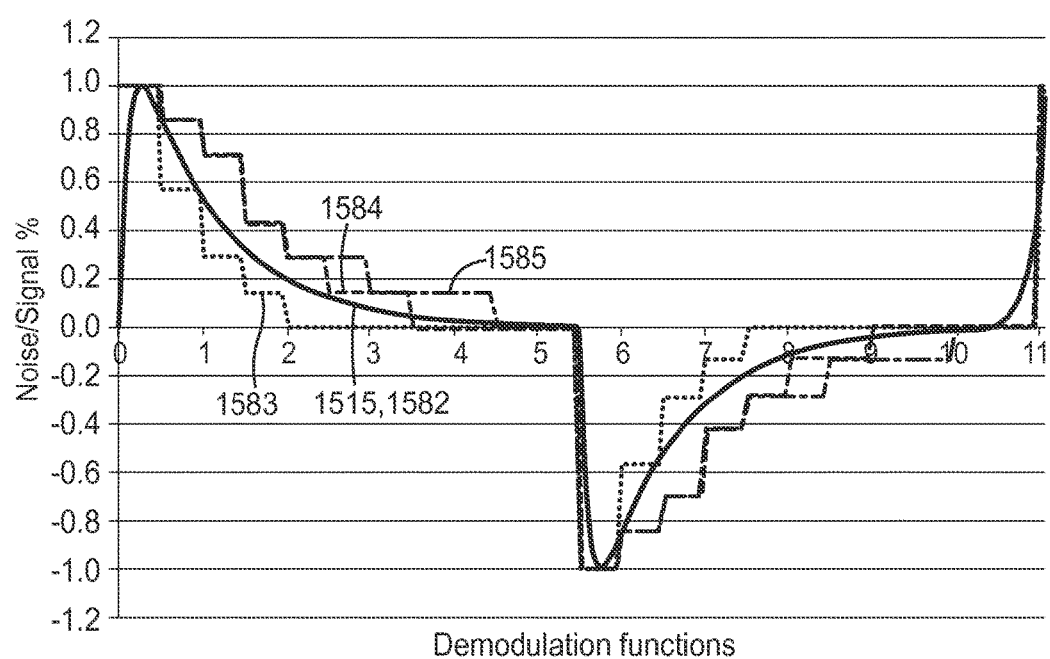
FIG. 15A shows a single cycle of response signal with an exponential decay time constant of 1 μsec, and four alternative fD(t) transfer functions that may be used to synchronously demodulate signal.

FIG. 15A shows a single cycle of response signal 1515 with an exponential decay time constant of 1 μsec, and four alternative fD(t) transfer functions that may be used to synchronously demodulate signal 1515. Signal 1584 is a quantized fD(t) intended to approximately match signal 1515, (similar to signal 1154, FIG. 11). Signal 1585 is a quantized fD(t) intended to approximately match an exponentially decaying signal similar to 1515, but with a decay time constant of 1.5 μsec. Signal 1583 is a quantized fD(t) intended to approximately match an exponentially decaying signal similar to 1515, but with a decay time constant of 0.5 μsec. The fourth demodulating function 1582 is the same shape as a noise-free signal 1515.

Figure 15B:
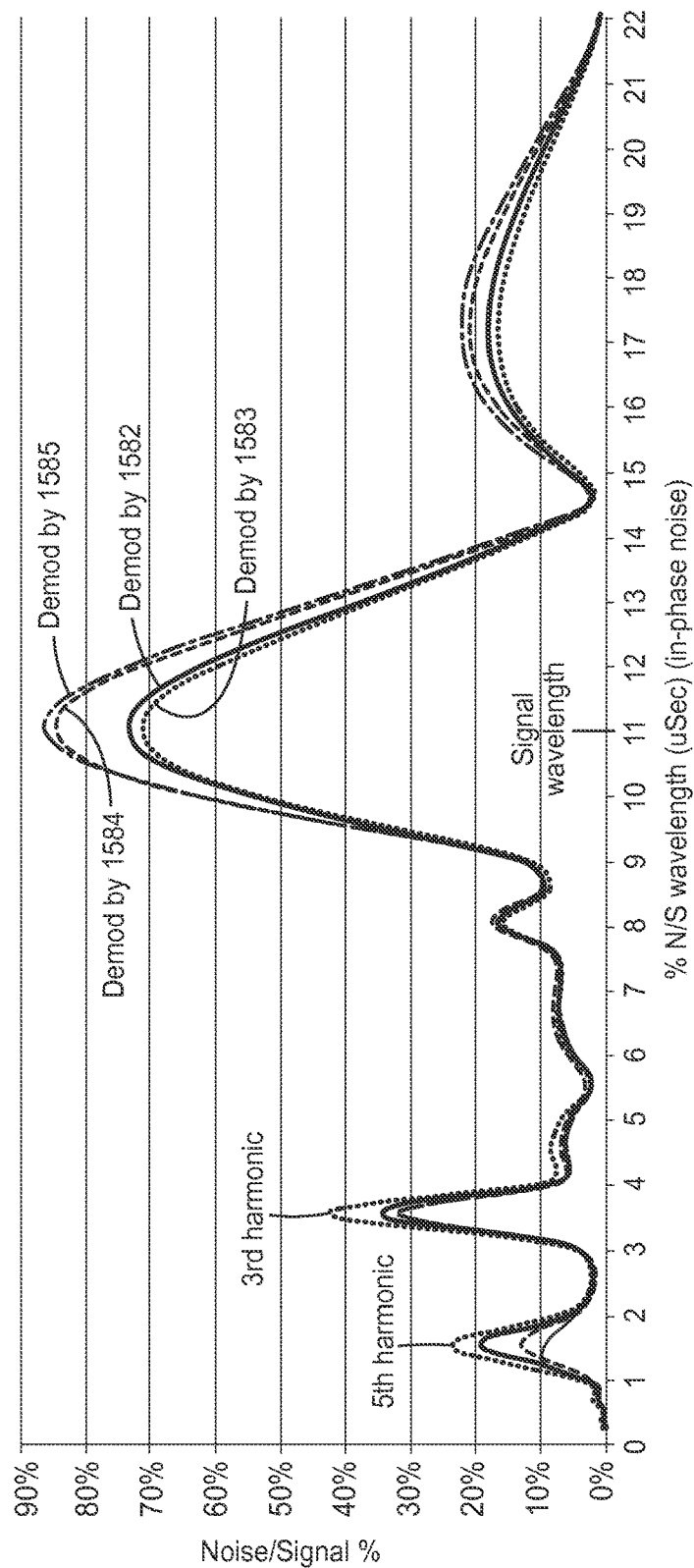
FIG. 15B shows the vector magnitude of noise across a range of noise wavelengths, centered on the signal wavelength of 11 μsec for each of the four alternative transfer functions of FIG. 15A.

FIG. 15B shows the vector magnitude of noise across a range of noise wavelengths, centered on the signal wavelength of 11 μsec. FIGS. 15A and 15B show that performance of the three quantized demodulation functions fD(t) 1583, 1584, 1585 have similar performance over a range of noise frequencies. Matched function 1582 is the optimal demodulation function, and near-match function 1584 has better performance in many noise frequency ranges than functions 1583 and 1585.

Figure 15C:
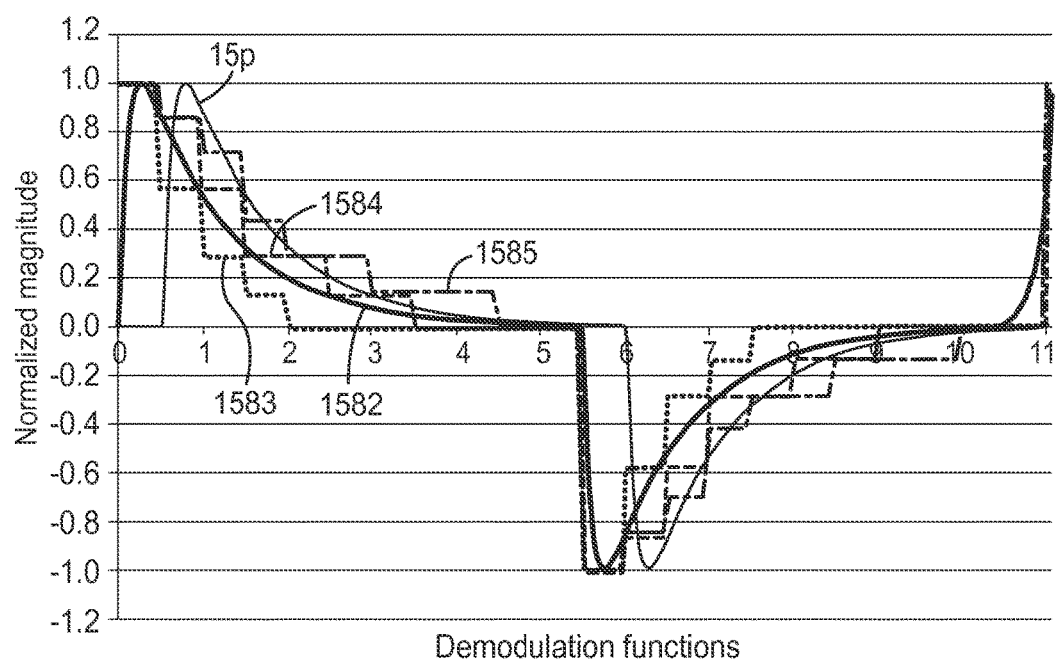
FIG. 15C shows a single cycle of response signal with an exponential decay time constant of 1 μsec that is delayed in time with respect to four alternative fD(t) transfer functions that may be used to synchronously demodulate signal.

FIG. 15C shows a single cycle of response signal 1515*p* with an exponential decay time constant of 1 μsec, and four alternative fD(t) transfer functions 1582, 1583, 1584, 1585 that may be used to synchronously demodulate signal 1515*p*. Signal 1515*p* is shifted (delayed) in time with respect to the four alternative fD(t) transfer functions 1582, 1583, 1584, 1585 by 0.5 μsec. Signal 1584 is a quantized fD(t) intended to approximately match signal 1515*p*, (similar to signal 1154, FIG. 11). Signal 1585 is a quantized fD(t) intended to approximately match an exponentially decaying signal similar to 1515, but with a decay time constant of 1.5 μsec. Signal 1583 is a quantized fD(t) intended to approximately match an exponentially decaying signal similar to 1515*p*, but with a decay time constant of 0.5 μsec. The fourth demodulating function 1582 is the same shape as a noise-free signal 1515*p*.

Figure 15D:
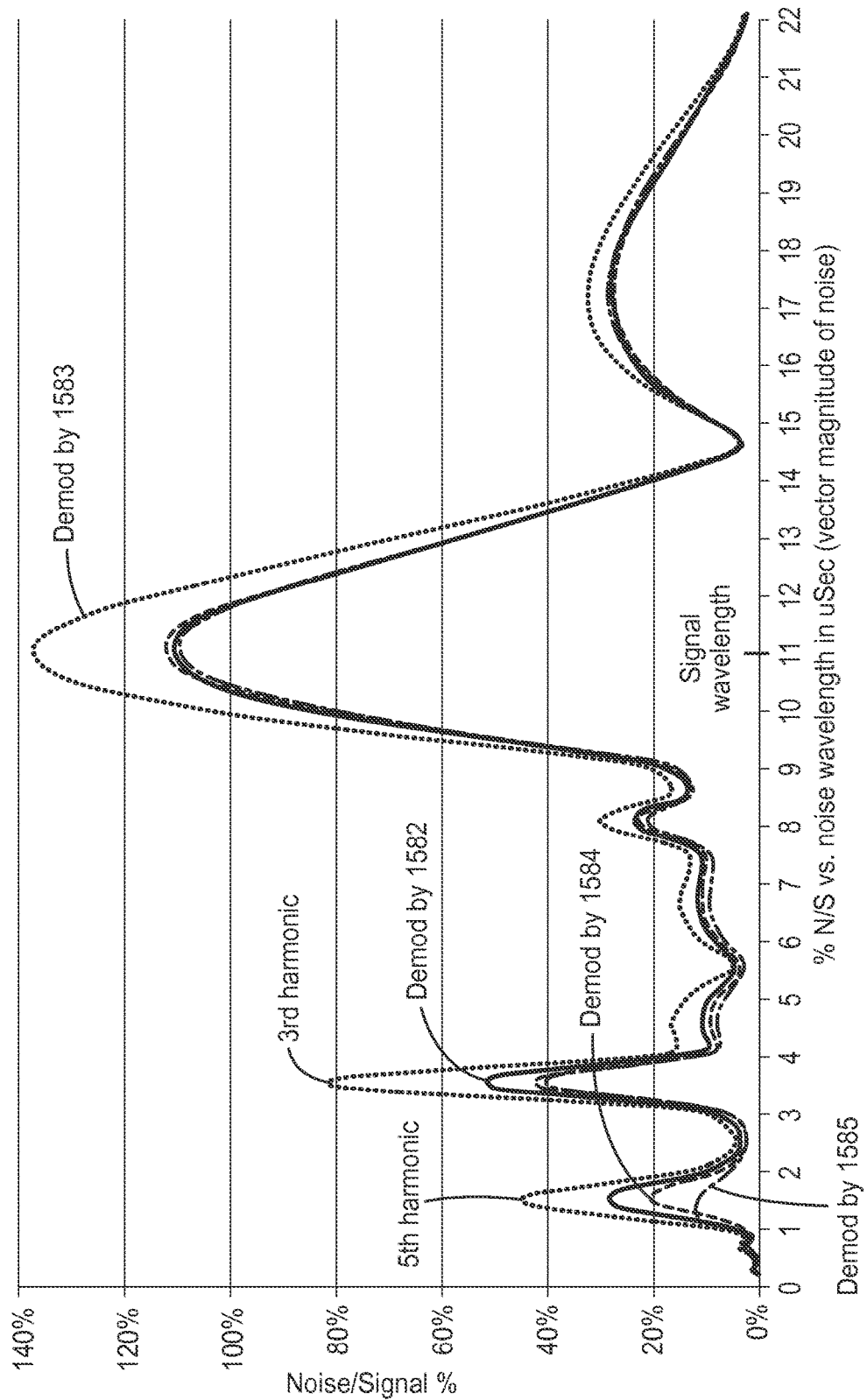
FIG. 15D shows the vector magnitude of noise across a range of noise wavelengths, centered on the signal wavelength of 11 μsec for each of the four alternative transfer functions of FIG. 15C.

FIG. 15D shows the vector magnitude of noise across a range of noise wavelengths, centered on the signal wavelength of 11 μsec. FIGS. 15C and 15D show that performance of signal 1585, which is a quantized fD(t) intended to approximately match an exponentially decaying signal similar to 1515*p*, but with a longer decay time constant of 1.5 μsec, has better performance in many noise frequency ranges than functions 1582, 1583, and 1584. Signal 1583 is matched but with a shorter (0.5 uSec) time constant has the greatest performance degradation as a result of the phase shift. This demonstrates that a wider (e.g. longer time constant) transfer function may yield better performance in some cases where the transfer function is phase shifted relative to the signal being measured.

Figure 16A:
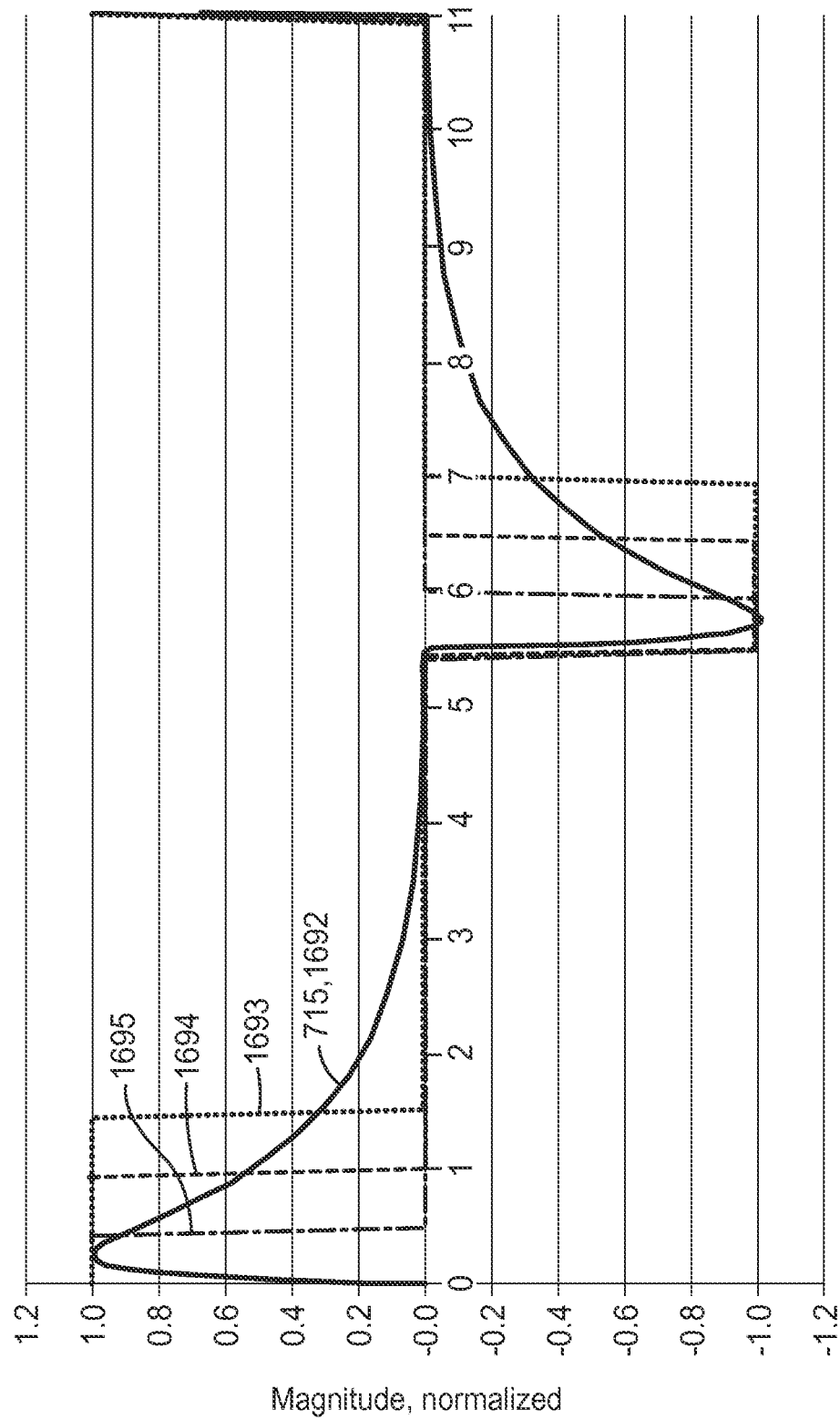
FIG. 16A shows additional demodulation transfer functions applied to response signal.
Figure 16B:
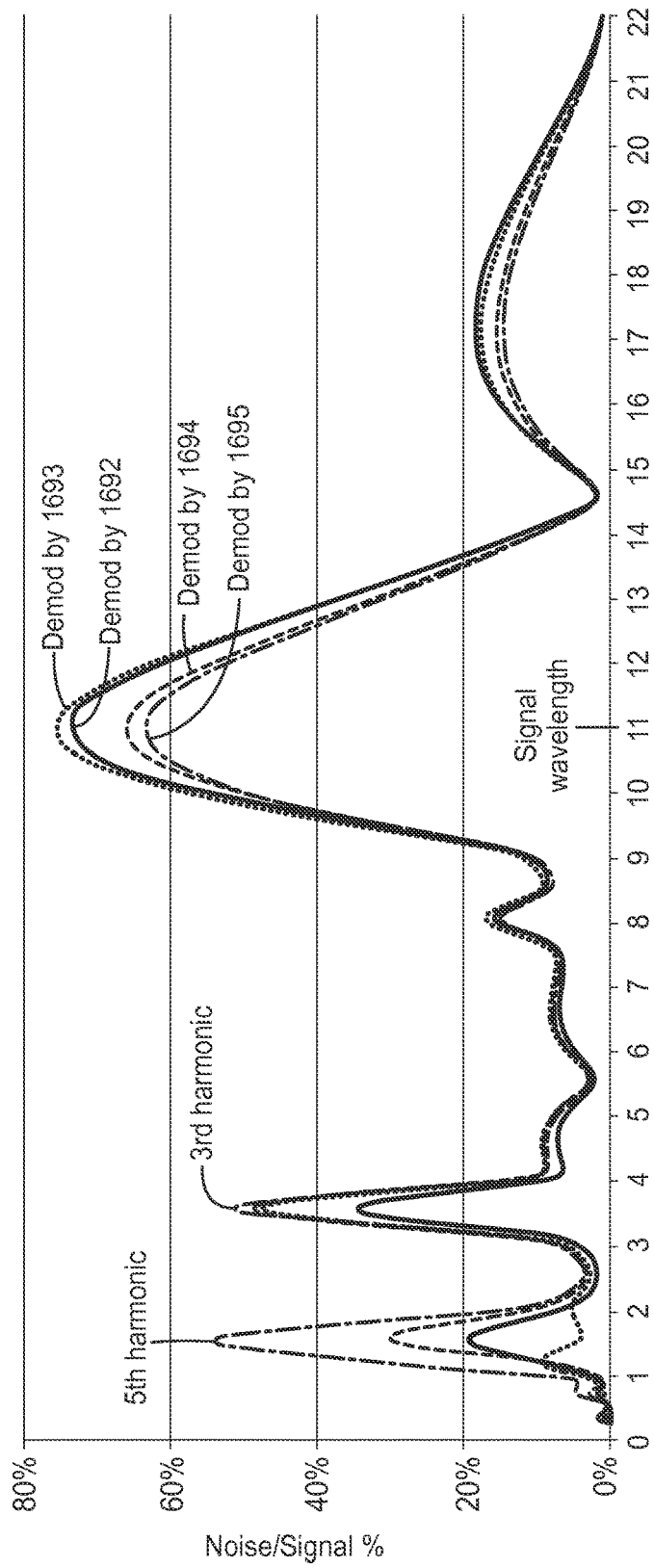
FIG. 16B shows the magnitude of noise/signal across a range of noise wavelengths, centered on the signal wavelength of 11 μsec for each of the transfer functions of FIG. 16A.

FIG. 16A shows additional demodulation transfer functions applied to signal 715. Functions 1693, 1694, and 1695 are simple sampling functions having widths of 3, 2, and 1 sample period respectively. Demodulation function 1692 matches the signal 715. FIG. 16B shows the magnitude of noise/signal across a range of noise wavelengths, centered on the signal wavelength of 11 μsec. Matched transfer function 1692 performs well except at the fundamental signal frequency, and various ones of functions 1693, 1694, and 1695 have better N/S performance in some noise frequency ranges.

Figure 16C:
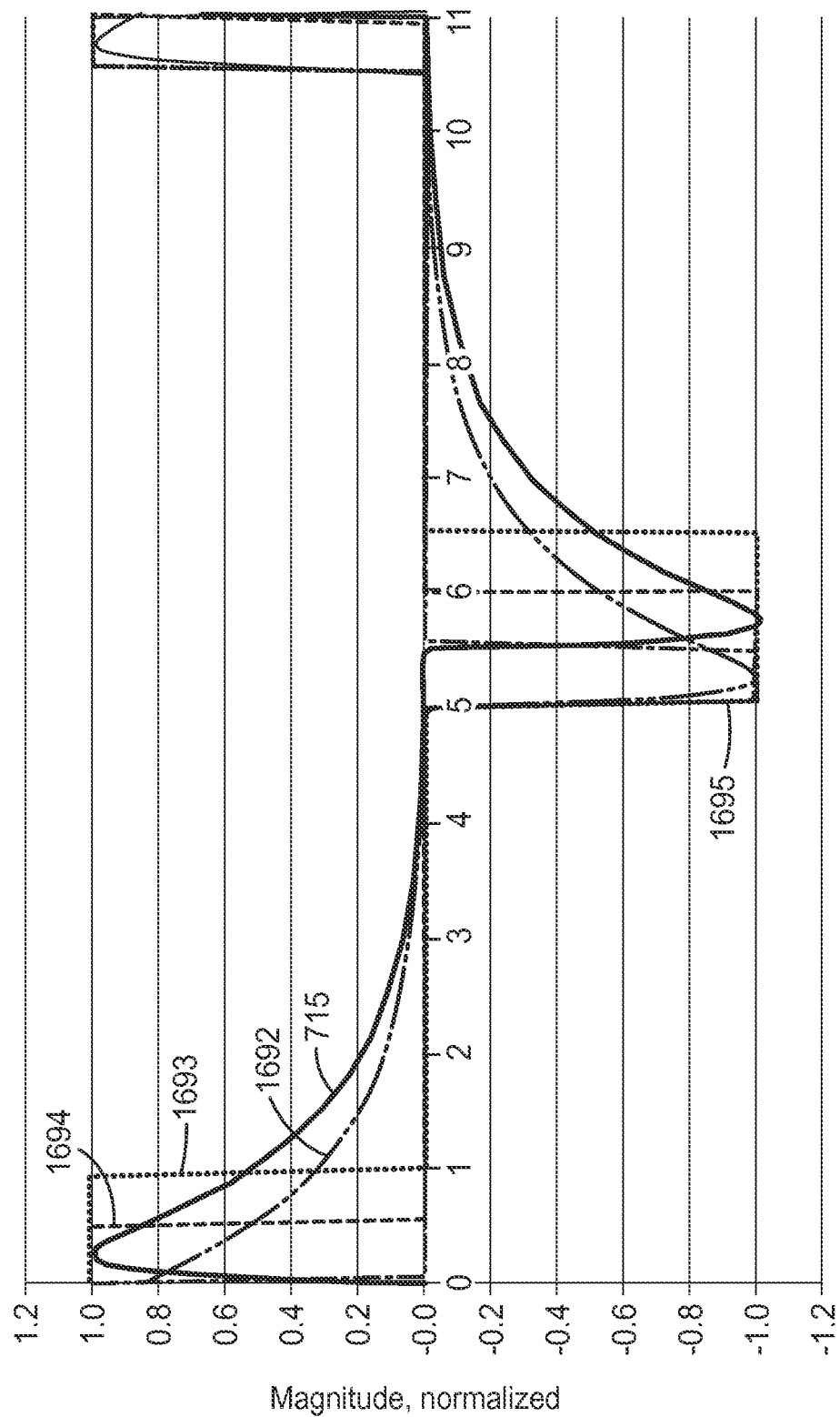
FIG. 16C shows the same demodulation functions as in FIG. 16A, but they are advanced in phase by one time period relative to the response signal.
Figure 16D:
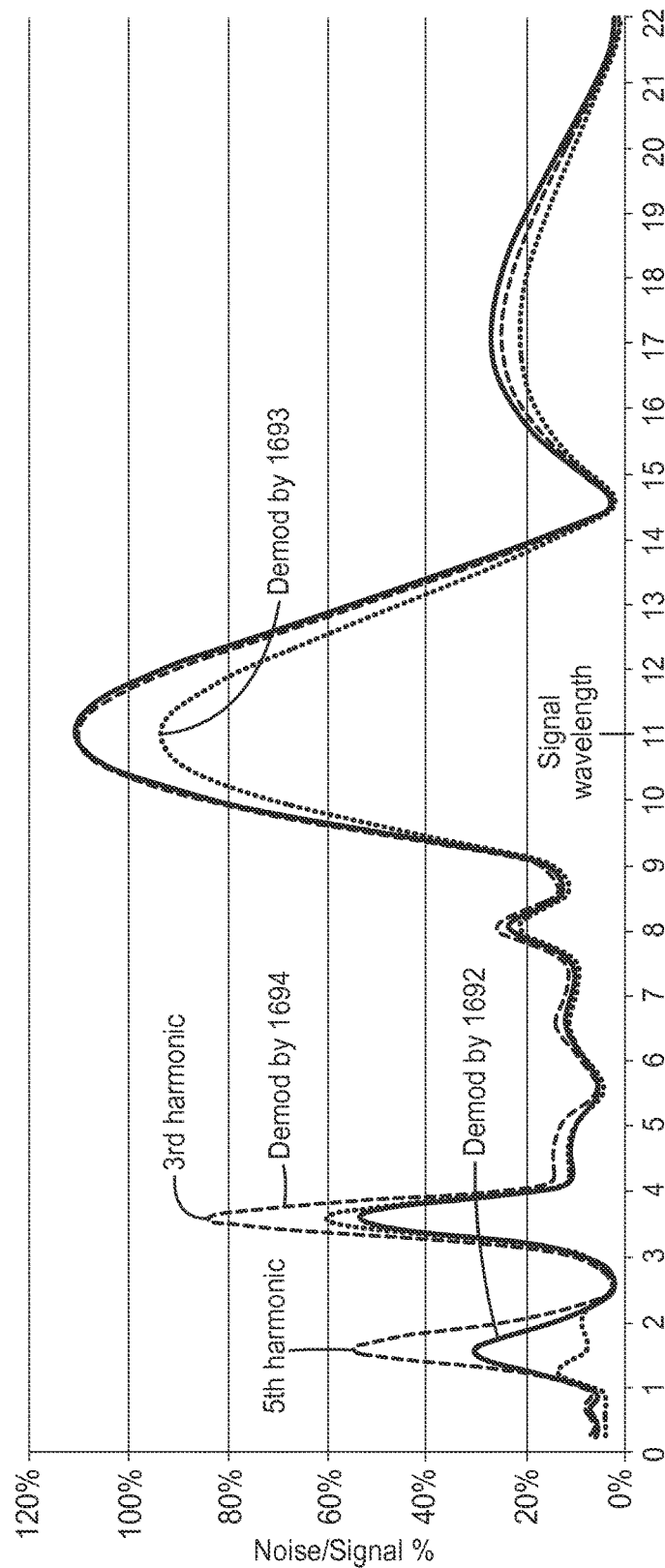
FIG. 16D shows the magnitude of noise/signal across a range of noise wavelengths, centered on the signal wavelength of 11 μsec for each of the transfer functions of FIG. 16C.

FIG. 16C shows the same demodulation functions as in FIG. 16A, but they are advanced in phase by one time period relative to signal 715. FIG. 16D shows the magnitude of noise/signal across a range of noise wavelengths, centered on the signal wavelength of 11 μsec. The N/S of function 1695 is omitted from FIG. 16D because at most frequencies it is more than 100 times larger than the other N/S measurements. This is because function 1695 samples signal 715 at times when signal 715 is near zero. The wider demodulation function 1693 has better N/S than functions 1692 and 1694 at many frequencies, because it demodulates a larger portion of signal 715 relative to noise.

FIGS. 12A, 12B, 12C show ratios of noise to signal (N/S), as measured by simulated measurement circuits 714. It is apparent that different demodulation transfer functions may result in different N/S ratios. If the N/S ratio can be known for a specific system with specific noise levels and/or noise spectrum, it may be possible to adapt the demodulation transfer function to achieve specified N/S ratios, such as a minimum N/S ratio.

Figure 17A:
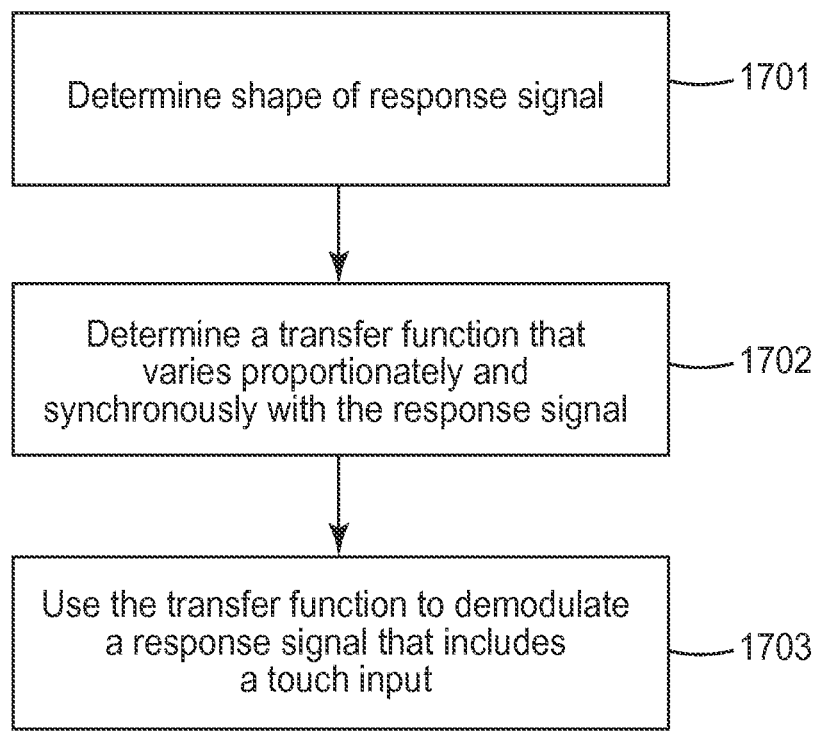
FIGS. 17A and 17B are flow diagrams that illustrate calibration processes for a touch apparatus in accordance with various embodiments.

Some embodiments involve a method of calibrating a touch apparatus by matching a transfer function used to measure the response signal to the response signal. The calibration may be performed during an initialization period prior to using the touch apparatus to detect the touch input. FIG. 17A is a flow diagram that illustrates a calibration process for a touch apparatus in accordance with some embodiments. The calibration involves determining the shape 1701 of the response signal of a receive electrode. A time-varying transfer function that varies proportionately and synchronously with the response signal is determined 1702. The transfer function can subsequently used 1703 to demodulate a response signal that includes a touch input.

The response signals generated for the receive electrodes may vary from electrode to electrode. Thus, a different time-varying transfer function may be determined for each electrode or for groups of adjacent electrodes. The response signal for a particular receive electrode may also vary along a length of the receive electrode. Thus, in some implementations, multiple transfer functions may be formed for a receive electrode, wherein each of the multiple transfer functions corresponds respectively to a drive electrode position along the receive electrode.

Figure 17B:
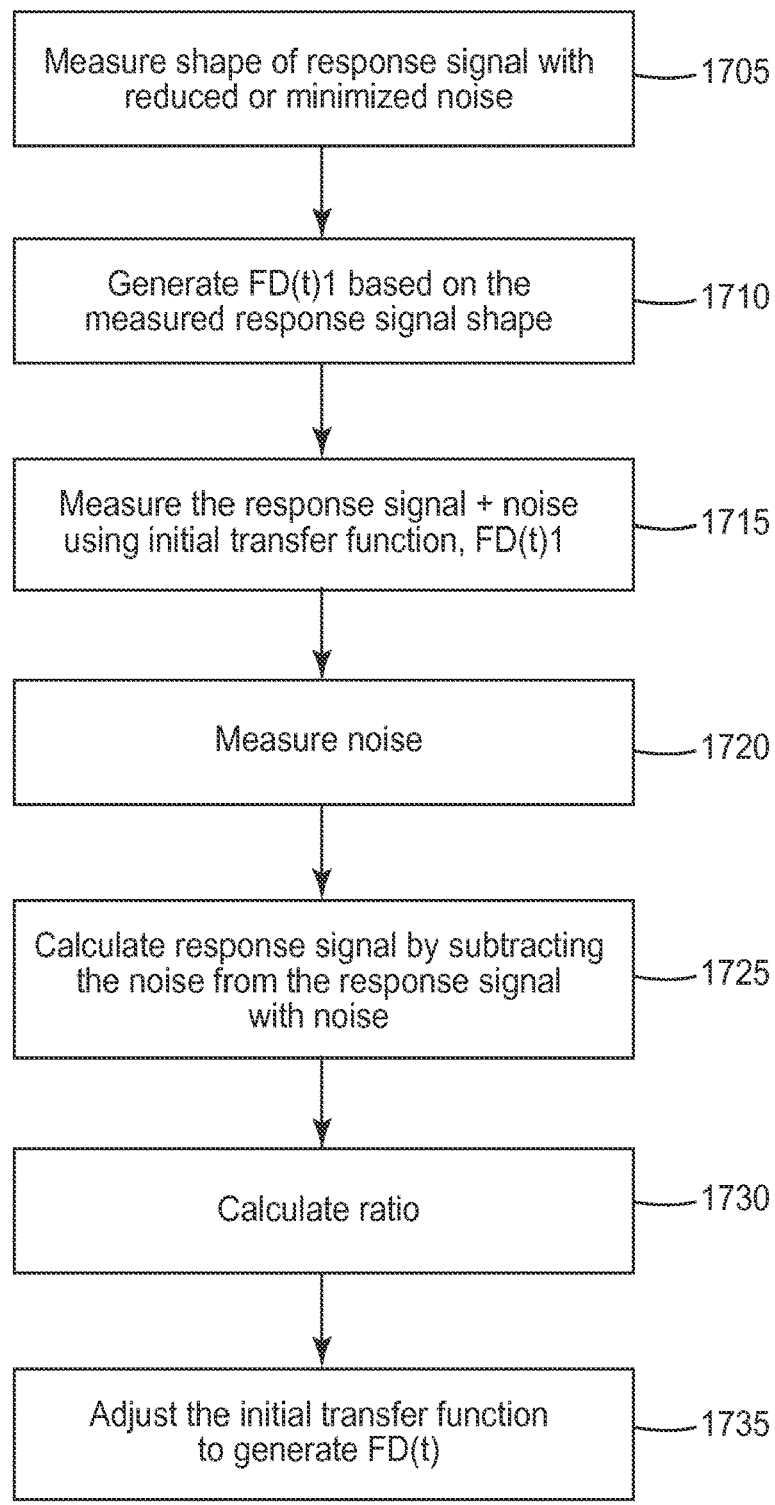

FIG. 17B is a more detailed flow diagram illustrating a calibration process in accordance with some implementations. The shape and magnitude of the response signal are determined 1705 while the noise is reduced or minimized. For example, the shape and magnitude of the response signal may be determined using a near-matching transfer function that is known a priori to be a reasonably close match with the response signal. Noise may be reduced or minimized during the process of determining the transfer function by turning off the drive signal and/or other noise sources.

An initial transfer function is formed 1710 based on the shape and magnitude of the response signal with reduced noise. The shape and magnitude of the response signal with noise is determined 1715 using the initial transfer function. The noise is measured 1720 and the noise is subtracted 1725 from the response signal with noise. The result of subtracting the noise from the response signal with noise is referred to as a noise-subtracted response signal. A ratio of the noise (N) and the noise-subtracted noise signal (S) is formed 1730, e.g., either N/S or S/N. The initial transfer function may be iteratively adjusted 1735 to reduce the N/S value (or increase the S/N value). For example the transfer function may be formed by adjusting the initial transfer function such that the ratio is within a specified range. The adjusted transfer function can be used during operation of the touch apparatus for touch detection.

An option for adjusting the transfer function involves re-determining the response signal with noise using the initial transfer function at a lagging or leading phase. The initial transfer function is then adjusted based on the result of re-determining response signal with noise. Another option involves re-determining the response signal with noise using a transfer function that is narrower or wider in time than the initial transfer function. The initial transfer function is then adjusted based on the result of re-determining of the response signal with noise. Adjusting the transfer function may involve adjusting the shape and/or phase of the transfer function. Optionally, parameters of the touch apparatus other than the transfer function may additionally be adjusted to increase a signal to noise ratio, such as adjusting a frequency of the drive signal and/or adjusting a duration of the integration period of the response signal. The transfer function and optionally other parameters may be iteratively adjusted until the N/S or S/N ratio is within a specified range.

Optionally, the noise spectrum may be measured and the transfer function may be adjusted based on the measured noise spectrum, as is described with respect to function 1155, (FIG. 10). For example, the noise spectrum can be measured at a fundamental frequency of the drive signal and/or at one or more harmonics of the fundamental frequency. In some implementations, measuring the noise spectrum involves measuring the noise signal at a frequency less than a fundamental frequency of the drive signal. The noise spectrum may be determined similarly to the way that signal shape is measured using sampling pulses as described above. Using a similar process, the shape and magnitude of noise signal may be measured.

Figure 18A:
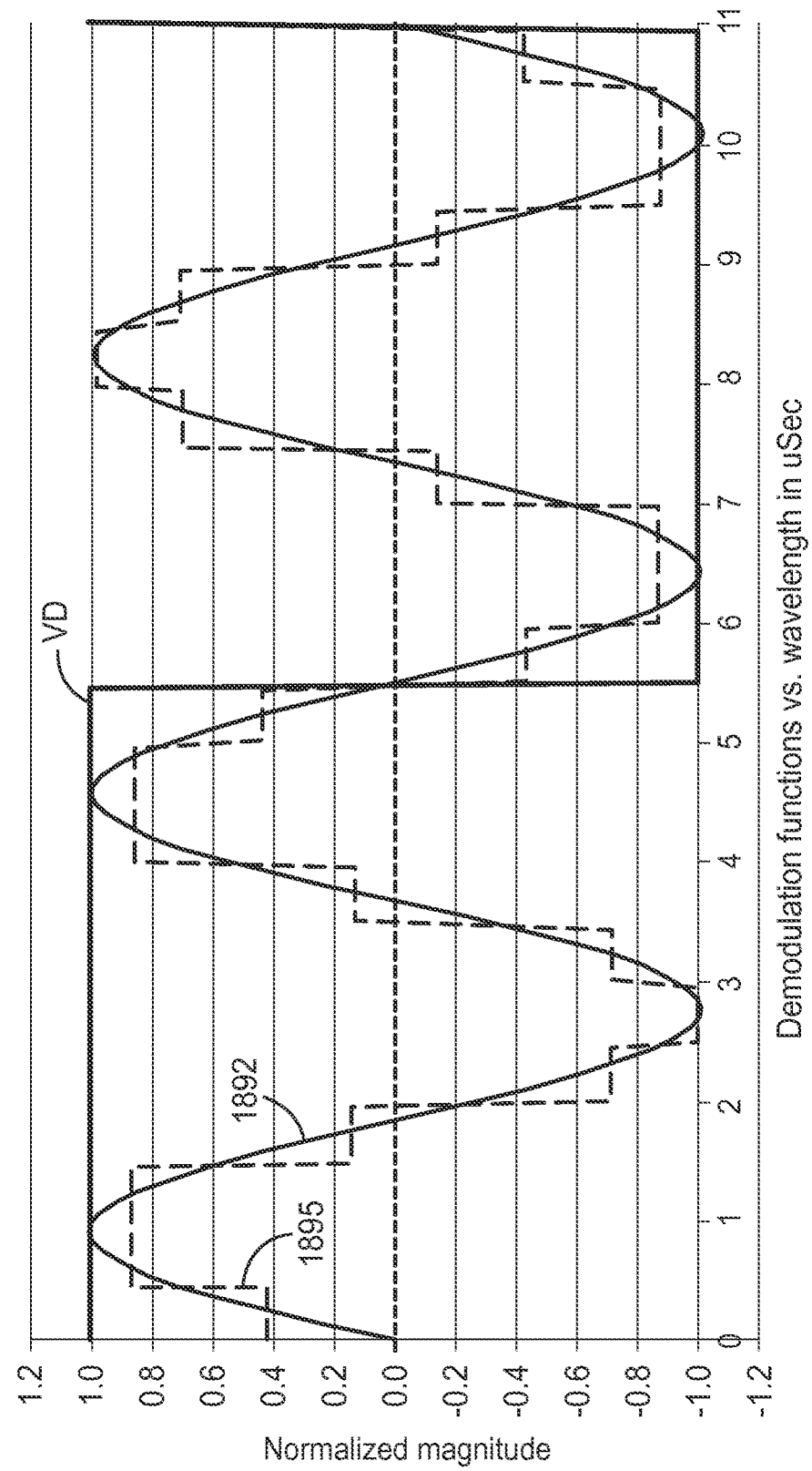
FIG. 18A shows several demodulation transfer functions matched to the third harmonic of square wave signal $V_D$.
Figure 18B:
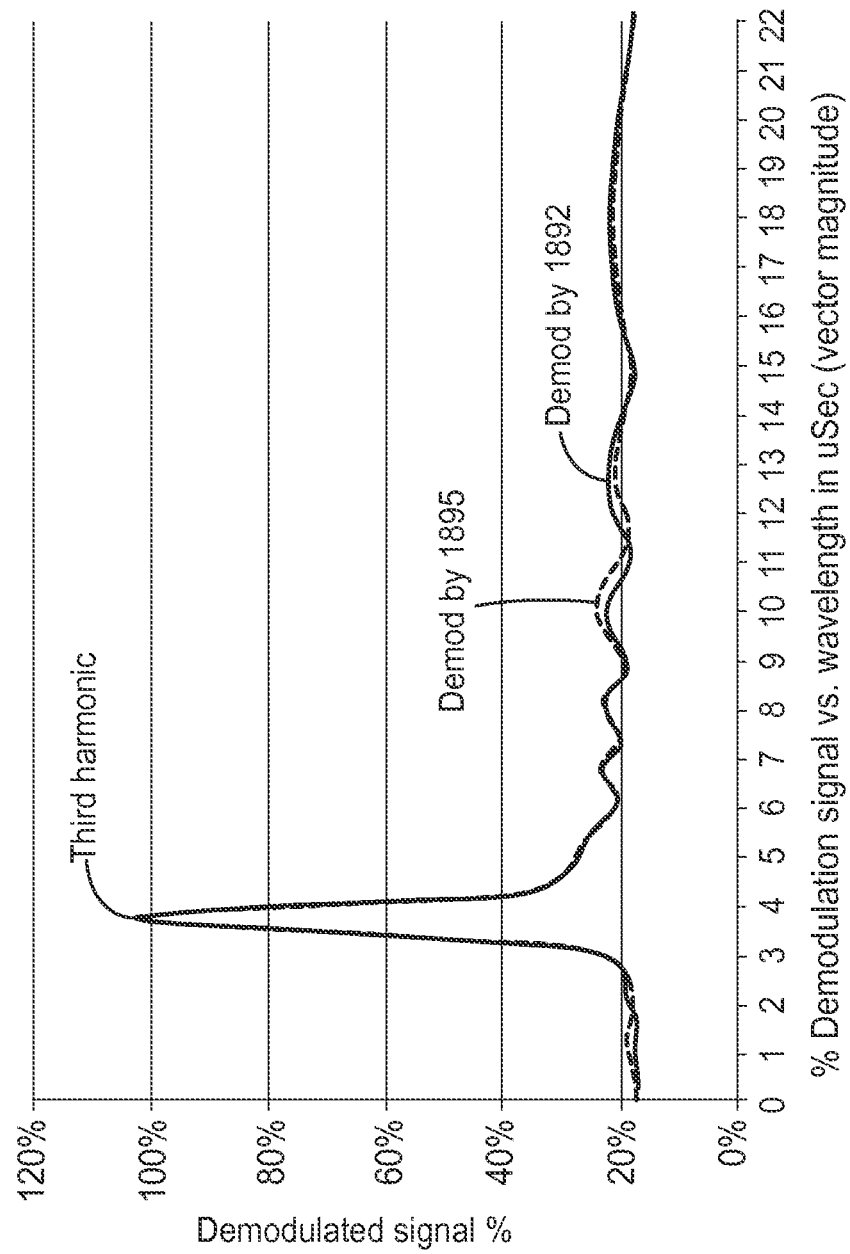
FIG. 18B shows the demodulated, integrated output resulting from applying the demodulation transfer functions of FIG. 18A to sine waves having wavelengths from 0.3 μsec to 22 μsec.

FIGS. 18A and 18B show an example where noise with a wavelength of 3.67 μsec (the third harmonic frequency of signal 715) is measured. For noise measurements, driven signal $V_D$ is turned off, so signal 15 contains only noise. Given that $V_D$ and has a wavelength of 24t, an integration period of an K integer multiples of 24t will measure the noise in K signal wavelengths. Typically, much of the noise is not synchronous with signal $V_D$, so it is generally preferable to measure noise over more signal wavelengths than are used to measure signal 715 during normal operation.

FIG. 18A shows several demodulation transfer functions. Demodulation transfer function 1892 is matched to the third harmonic of square wave signal $V_D$. Demodulation transfer function 1895 is a quantized function approximately matching to the third harmonic of square wave signal $V_D$. Noise at other frequencies may be measured by using transfer functions having the desired frequency and waveshape. If wavelengths other than multiples of sample time t are measured, the duration of t may be changed by altering the clock frequency of the system clock that establishes the duration of sample time t.

FIG. 18B shows the demodulated, integrated output resulting from applying sine waves of wavelengths from 0.3 μsec to 22 μsec. Demodulation transfer functions 1892 and 1895 selectively pass the desired third harmonic while blocking 90% or more of all other frequencies. Thus noise a noise spectrum can be measured, and the measurement system may be adjusted to avoid noise. For example, the frequency of signal $V_D$ may be modified, and the duration of sampling periods t1, t2, etc., may be adjusted to match the change in frequency of $V_D$. The duration of an integration period may be changed and/or the demodulation transfer function FD(t) (shape or phase) may be changed to avoid noise that was measured to have a particular frequency or phase relationship with the measurement circuitry.

Figure 19:
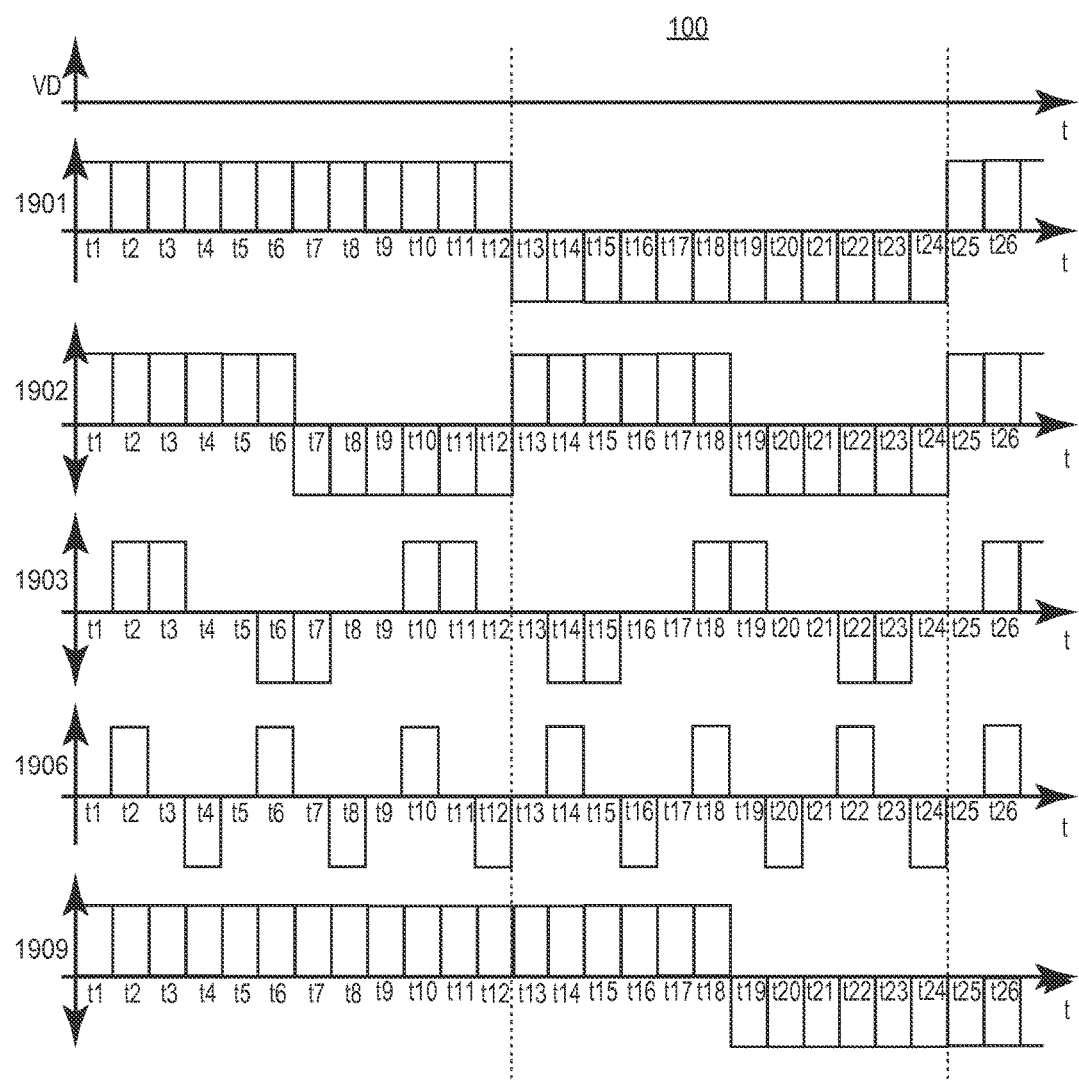
FIG. 19 shows several examples of noise measurement.

FIG. 19 shows several examples of noise measurement. Given that the desired receive signal 715 has a wavelength of 16t as shown in FIG. 19, an integration period of K integer multiples of 16t will measure K signal wavelengths of noise. Given that much of the noise is not synchronous with signal 715, it is generally preferable to measure noise over more signal wavelengths than are used to measure signal 715.

For noise measurements, driven signal $V_D$ is turned off, so signal 715 contains only noise. FIG. 19 shows several demodulation transfer functions that will measure noise of various frequencies.

Demodulation transfer function 1901 measures noise at the fundamental frequency of $V_D$. Demodulation transfer function 1902 measures noise at the second harmonic of signal $V_D$. Demodulation transfer function 1903 measures noise at the third harmonic of signal $V_D$. Demodulation transfer function 106 measures noise at the sixth harmonic of signal $V_D$.

Noise at other frequencies may be measured by using FD(t) functions having the desired frequency. To measure wavelengths other than multiples of sample time t, the duration of t may be changed by altering the clock frequency of the system clock that establishes the duration of sample time t.

Demodulation function 1909 is an example of a demodulation function that measures noise at a wavelength longer than the (24t) fundamental frequency of signal $V_D$. Example 1909 measures a noise wavelength of 36t, not all of which is shown.

Thus a noise spectrum can be measured, and the measurement system may be adjusted to avoid noise. For example, the duration of sampling periods t1, t2, etc., may be adjusted to change the frequency of signal $V_D$. The duration of an integration period may be changed, (e.g. to a duration of 16t rather than 24t as shown in graphs 1900). Or, the demodulation transfer function FD(t) (shape or phase) may be changed to avoid noise that was measured to have a particular frequency or phase relationship with the measurement circuits.

Embodiments described in this disclosure include the following items:

Item 1. A touch-sensitive apparatus, comprising:
 a drive electrode capacitively coupled to a receive electrode;
 a sense circuit configured to generate a response signal for the receive electrode in response to a drive signal delivered to the drive electrode, the response signal comprising a positive-going transition portion separated from a negative-going transition portion; and
 an amplification circuit comprising a time-varying gain having an increased gain substantially aligned with the positive- and negative-going transition portions of the response signal and a reduced gain between the positive- and negative-going transition portions of the response signal.

Item 2. The touch sensitive apparatus of item 1, wherein the amplification circuit comprises a time-varying resistance that is synchronized with the drive signal.

Item 3. The touch sensitive apparatus of any of items 1 through 2, wherein the amplification circuit comprises a plurality of resistors in parallel connected to an input port of an operational amplifier, values of at least two resistors in the plurality of resistors being different from each other, each resistor in the plurality of resistors having a different corresponding switch.

Item 4. The touch sensitive apparatus of any of items 1 through 3, wherein the amplification circuit comprises a time-varying capacitance that is synchronized with the drive signal.

Item 5. A touch-sensitive apparatus, comprising:
 a drive electrode capacitively coupled to a receive electrode;
 a sense circuit configured to generate a response signal for the receive electrode in response to a drive signal delivered to the drive electrode, the response signal comprising a positive-going transition portion separated from a negative-going transition portion; and
 an amplification circuit comprising a time-varying time constant having smaller values substantially aligned with the positive- and negative-going transition portions of the response signal and greater values between the positive- and negative-going transition portions of the response signal.

Item 6. The touch sensitive apparatus of item 5, wherein the time-varying time constant comprises a time-varying resistance.

Item 7. The touch sensitive apparatus of any of items 5 through 6, wherein the time-varying time constant comprises a time-varying capacitance.

Item 8. A touch-sensitive apparatus, comprising:
 a drive electrode capacitively coupled to a receive electrode;
 a sense circuit configured to generate a response signal for the receive electrode in response to a drive signal delivered to the drive electrode, the response signal comprising a harmonic of the drive signal; and
 an amplification circuit comprising a time-varying gain having reduced gain in a frequency range corresponding to the harmonic.

Item 9. The touch-sensitive apparatus of item 8, wherein the harmonic comprises a plurality of odd harmonics, and the time-varying gain has a plurality of minima in the frequency range corresponding to the plurality of the odd harmonics.

Item 10. A touch-sensitive apparatus, comprising:
 a drive electrode capacitively coupled to a receive electrode;
 a sense circuit coupled to the receive electrode and comprising:
  a first stage coupled to the receive electrode and configured to generate a response signal for the receive electrode in response to a drive signal delivered to the drive electrode, the response signal being a differentiated representation of the drive signal and comprising at least one odd harmonic and at least one even harmonic of the drive signal;
  a second stage coupled to an output of the first stage suppressing the at least one odd harmonic in the response signal; and
  a third stage capacitively coupled to an output of the second stage amplifying an output of the second stage and suppressing the at least one even harmonic in the response signal.

Item 11. The touch-sensitive apparatus of item 10, wherein:
 the first stage comprises a variable gain differentiating circuit;
 the second stage comprises a gain having a null in a frequency response corresponding to the at least one odd harmonic; and
 the third stage comprises a summing integrator.

Item 12. A touch-sensitive apparatus, comprising:
 a drive electrode capacitively coupled to a receive electrode;
 a sense circuit generating a response signal for the receive electrode in response to a drive signal delivered to the drive electrode, the response signal comprising a positive-going transition portion separated from a negative-going transition portion;
 an amplifier configured to amplify the response signal and having a non-linear gain; and
 an integrator subtracting the negative-going transition portion of the response signal from the positive-going transition portion of the response signal.

Item 13. A system, comprising:
 a touch-sensitive apparatus, comprising:
  a touch panel comprising a touch sensitive surface and at least one a drive electrode capacitively coupled to at least one receive electrode;
  a sense circuit configured to generate a response signal for the receive electrode in response to a drive signal delivered to the drive electrode; and
  a measurement circuit configured to apply a time-varying transfer function to the response signal; and
 a calibration circuit configured to match the time-varying transfer function to the response signal, the transfer function varying proportionately and synchronously with the response signal.

Item 14. A touch-sensitive apparatus, comprising:
 a touch panel comprising a touch sensitive surface and at least one a drive electrode capacitively coupled to at least one receive electrode;
 a sense circuit configured to generate a response signal for the receive electrode in response to a drive signal delivered to the drive electrode; and
 a measurement circuit configured to apply a time-varying transfer function to the response signal, the transfer function varying proportionately and synchronously with the response signal.

Item 15. The apparatus of item 14, further comprising a touch processing circuit configured to detect a touch on the touch sensitive surface based on an output of the measurement circuit.

Item 16. The apparatus of any of items 14 through 15, wherein the measurement circuit includes an amplifier having a time-varying gain.

Item 17. The apparatus of any of items 14 through 16, wherein the measurement circuit includes an integrator having a time-varying gain.

Item 18. The apparatus of item 17, wherein the integrator has a time-varying RC constant.

Item 19. The apparatus of any of items 17 through 18, wherein the integrator has a time-varying gain capacitance.

Item 20. The apparatus of any of items 17 through 19, wherein the integrator has a time-varying gain resistance.

Item 21. The apparatus of any of items 17 through 20, wherein the sense circuit comprises a differentiator with a time-varying gain.

Item 22. The apparatus of any of items 14 through 21, wherein the measurement circuit is configured to multiply the response signal by the transfer function and to integrate a product of the multiplication over a period of time.

Item 23. The apparatus of item 22, wherein the period of time is an integer number of cycles of the response signal.

Item 24. A method, comprising:
    sensing a response signal on a receive electrode in response to a drive signal delivered to a drive electrode that is capacitively coupled to the receive electrode;
    applying a time-varying transfer function to the response signal, the transfer function varying proportionately and synchronously with the response signal; and
    detecting a touch on a touch sensitive surface using a result of the applying of the transfer function to the response signal.

Item 25. A method of using a touch apparatus that includes a touch sensitive panel comprising at least one drive electrode capacitively coupled to at least one receive electrode, the method comprising:
    determining a shape of a response signal for the receive electrode in response to a drive signal delivered to the drive electrode; and
    forming a time-varying transfer function that varies proportionately and synchronously with the response signal;
    applying the time-varying transfer function to a response signal that includes information about a touch on the touch panel.

Item 26. The method of item 25, wherein:
    applying the transfer function comprises multiplying the transfer function and the response signal; and
    further comprising integrating a product of the multiplying over a period of time.

Item 27. The method of item 26, wherein the period of time comprises an integer multiple of a period of the response signal.

Item 28. The method of any of items 25 through 27, wherein the response signal and the time-varying transfer function are represented in digital format.

Item 29. The method of any of items 25 through 28, wherein each of the response signal and the time-varying transfer function are represented as vectors comprising a series of values at discrete sequential times.

Item 30. The method of item 29, wherein applying the transfer function comprises forming a scalar product of the response signal vector and the transfer function vector.

Item 31. The method of item 25, wherein the response signal and the time-varying transfer function are represented in analog format.

Item 32. A method of calibrating a touch apparatus that includes a touch sensitive panel comprising at least one drive electrode capacitively coupled to at least one receive electrode, the method comprising:
    determining a shape of a response signal for the receive electrode in response to a drive signal delivered to the drive electrode; and
    forming a time-varying transfer function that varies proportionately and synchronously with the response signal.

Item 33. The method of item 32, wherein determining the shape of the response signal comprises determining shapes of a number of discrete portions the response signal.

Item 34. The method of item 33, wherein determining the shape of the response signal comprises determining an average value of the response signal for each of the discrete portions of the response signal.

Item 35. The method of any of items 32 through 34, wherein the calibrating is performed during an initialization period prior to using the touch apparatus to detect a touch.

Item 36. The method of any of items 32 through 35, wherein noise is mitigated during at least some portions of the calibrating.

Item 37. The method of any of items 32 through 36, wherein the response signal comprises a differentiated signal.

Item 38. The method of any of items 32 through 37, wherein determining the shape of the response signal comprises:
    determining a shape and magnitude of a response signal with reduced noise using a near-matching transfer function;
    forming an initial transfer function based on the shape and magnitude of the response signal with reduced noise; and
    determining a shape and magnitude of a response signal with noise using the initial transfer function.

Item 39. The method of item 38, wherein forming the time-varying transfer function comprises:
    measuring noise;
    calculating a noise-subtracted response signal by subtracting the noise from the response signal with noise;
    forming a ratio of the noise-subtracted response signal and the noise; and
    adjusting the initial transfer function based on the ratio.

Item 40. The method of item 39, wherein adjusting the initial transfer function comprises adjusting at least one of a time-varying shape and a time-varying magnitude of the initial transfer function.

Item 41. The method of item 40, wherein adjusting at least one of a time-varying shape and a time-varying magnitude of the initial transfer function comprises:
    re-determining the response signal with noise using the initial transfer function at a lagging or leading phase; and
    adjusting the shape of the initial transfer function based on the re-determining of the response signal with noise.

Item 42. The method of item 40, wherein adjusting at least one of a time-varying shape and a time-varying magnitude of the initial transfer function comprises:
    re-determining the response signal with noise using a transfer function that is narrower or wider in time than the initial transfer function; and
    adjusting the shape of the initial transfer function based on the re-determining of the response signal with noise.

Item 43. The method of item 40, further comprising:
    measuring a noise spectrum; and
    adjusting the shape of the initial transfer function based on the noise spectrum.

Item 44. The method of item 43, wherein determining the noise spectrum comprises determining a shape and magnitude of a noise signal with respect to time.

Item 45. The method of item 44, wherein determining the shape and magnitude of the noise signal comprises determining shapes and magnitudes of a number of discrete time portions of the noise signal.

Item 46. The method of item 43, wherein determining the noise spectrum comprises:

determining the shape and magnitude of the noise signal at a fundamental frequency of the drive signal; and determining the shape and magnitude of the noise signal at one or more harmonics of the fundamental frequency.

Item 47. The method of item 43, wherein determining the noise spectrum comprises determining the shape and magnitude of the noise signal at a frequency less than a fundamental frequency of the drive signal.

Item 48. The method of item 32, further comprising adjusting a parameter of the touch apparatus to increase a signal to noise ratio.

Item 49. The method of item 48, wherein adjusting the parameter comprises adjusting a frequency of the drive signal.

Item 50. The method of item 48, wherein adjusting the parameter comprises adjusting a duration of an integration period.

Item 51. The method of item 48, wherein adjusting the parameter comprises adjusting a shape or phase of the transfer function.

Item 52. A method of calibrating a touch sensitive panel comprising a plurality of drive electrodes capacitively coupled to a plurality of receive electrodes, the method comprising:

for each receive electrode:

determining a shape of a response signal for the receive electrode in response to a drive signal delivered to the drive electrode; and forming a time-varying transfer function that varies proportionately and synchronously with the response signal.

Item 53. The method of item 52, wherein determining the shape of the response signal comprises determining shapes of a number of discrete portions the response signal.

Item 54. The method of any of items 52 through 53, wherein the calibrating forms an adjusted transfer function for each receive electrode.

Item 55. The method of any of items 52 through 54, wherein the calibrating forms multiple transfer functions for each receive electrode, each of the multiple transfer functions corresponding respectively to a drive electrode position along the receive electrode.

Additional information relating to the embodiments of items 1 through 55 and other embodiments is disclosed in U.S. patent application Ser. No. 13/798,736 filed Mar. 13, 2013, which is incorporated herein by reference in its entirety.

Various modules and/or other circuit-based building blocks, as exemplified in the figures, may be implemented to carry out one or more of the operations and activities as described in connection with the figures. In such contexts, a "stage" of "module" is a circuit that carries out one or more of these or related operations/activities. For example, in certain of the above-discussed embodiments, one or more modules are discrete logic circuits or programmable logic circuits configured and arranged for implementing these operations/activities, as in the circuit modules shown in the Figures. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a hardware-based circuit and a set of instructions in the form of firmware, where the first module includes a first hardware circuit with one set of instructions and the second module includes a second hardware circuit with another set of instructions.

Also, unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Each numerical parameter should at least be construed in light of the number of reported significant digits and by applying ordinary rounding techniques.

Various modifications and alterations of this disclosure will be apparent to those skilled in the art without departing from the scope of this disclosure, and it should be understood that this disclosure is not limited to the illustrative embodiments set forth herein. For example, the reader should assume that features of one disclosed embodiment can also be applied to all other disclosed embodiments unless otherwise indicated.

The invention claimed is:

1. A touch-sensitive apparatus, comprising:

a drive electrode capacitively coupled to a receive electrode;

a sense circuit configured to generate a response signal for the receive electrode in response to a drive signal delivered to the drive electrode, the response signal comprising a positive-going transition portion separated from a negative-going transition portion; and an amplification circuit comprising a time-varying gain having an increased gain substantially aligned with the positive- and negative-going transition portions of the response signal and a reduced gain between the positive- and negative-going transition portions of the response signal.

2. The touch sensitive apparatus of claim 1, wherein the amplification circuit comprises a time-varying resistance that is synchronized with the drive signal.

3. The touch sensitive apparatus of claim 1, wherein the amplification circuit comprises a plurality of resistors in parallel connected to an input port of an operational amplifier, values of at least two resistors in the plurality of resistors being different from each other, each resistor in the plurality of resistors having a different corresponding switch.

4. The touch sensitive apparatus of claim 1, wherein the amplification circuit comprises a time-varying capacitance that is synchronized with the drive signal.

5. A touch-sensitive apparatus, comprising:

a drive electrode capacitively coupled to a receive electrode;

a sense circuit configured to generate a response signal for the receive electrode in response to a drive signal delivered to the drive electrode, the response signal comprising a positive-going transition portion separated from a negative-going transition portion; and an amplification circuit comprising a time-varying time constant having smaller values substantially aligned with the positive- and negative-going transition portions of the response signal and greater values between the positive- and negative-going transition portions of the response signal.

6. The touch sensitive apparatus of claim 5, wherein the time-varying time constant comprises a time-varying resistance.

7. The touch sensitive apparatus of claim 5, wherein the time-varying time constant comprises a time-varying capacitance.

8. A touch-sensitive apparatus, comprising:
a drive electrode capacitively coupled to a receive electrode;
a sense circuit configured to generate a response signal for the receive electrode in response to a drive signal delivered to the drive electrode, the response signal comprising a harmonic of the drive signal; and
an amplification circuit comprising a time-varying gain having reduced gain in a frequency range corresponding to the harmonic.

9. The touch-sensitive apparatus of claim 8, wherein the harmonic comprises a plurality of odd harmonics, and the time-varying gain has a plurality of minima in the frequency range corresponding to the plurality of the odd harmonics.

10. A touch-sensitive apparatus, comprising:
a drive electrode capacitively coupled to a receive electrode;
a sense circuit coupled to the receive electrode and comprising:
a first stage coupled to the receive electrode and configured to generate a response signal for the receive electrode in response to a drive signal delivered to the drive electrode, the response signal being a differentiated representation of the drive signal and comprising at least one odd harmonic and at least one even harmonic of the drive signal;
a second stage coupled to an output of the first stage suppressing the at least one odd harmonic in the response signal; and
a third stage capacitively coupled to an output of the second stage amplifying an output of the second stage and suppressing the at least one even harmonic in the response signal.

11. The touch-sensitive apparatus of claim 10, wherein:
the first stage comprises a variable gain differentiating circuit;
the second stage comprises a gain having a null in a frequency response corresponding to the at least one odd harmonic; and
the third stage comprises a summing integrator.

12. A touch-sensitive apparatus, comprising:
a drive electrode capacitively coupled to a receive electrode;
a sense circuit generating a response signal for the receive electrode in response to a drive signal delivered to the drive electrode, the response signal comprising a positive-going transition portion separated from a negative-going transition portion;
an amplifier configured to amplify the response signal and having a non-linear gain; and
an integrator subtracting the negative-going transition portion of the response signal from the positive-going transition portion of the response signal.

13. A system, comprising:
a touch-sensitive apparatus, comprising:
a touch panel comprising a touch sensitive surface and at least one a drive electrode capacitively coupled to at least one receive electrode;
a sense circuit configured to generate a response signal for the receive electrode in response to a drive signal delivered to the drive electrode; and
a measurement circuit configured to apply a time-varying transfer function to the response signal; and
a calibration circuit configured to match the time-varying transfer function to the response signal, the transfer function varying proportionately and synchronously with the response signal.

14. A touch-sensitive apparatus, comprising:
a touch panel comprising a touch sensitive surface and at least one a drive electrode capacitively coupled to at least one receive electrode;
a sense circuit configured to generate a response signal for the receive electrode in response to a drive signal delivered to the drive electrode; and
a measurement circuit configured to multiply the response signal by a time-varying transfer function and to integrate a product of the multiplication over a period of time, the transfer function varying proportionately and synchronously with the response signal.

15. The apparatus of claim 14, further comprising a touch processing circuit configured to detect a touch on the touch sensitive surface based on an output of the measurement circuit.

16. The apparatus of claim 14, wherein the measurement circuit includes an amplifier having a time-varying gain.

17. The apparatus of claim 14, wherein the measurement circuit includes an integrator having a time-varying gain.

18. The apparatus of claim 17, wherein the integrator has a time-varying RC constant.

19. The apparatus of claim 17, wherein the integrator has a time-varying gain capacitance.

20. The apparatus of claim 17, wherein the integrator has a time-varying gain resistance.

21. The apparatus of claim 17, wherein the sense circuit comprises a differentiator with a time-varying gain.

22. The apparatus of claim 14, wherein the period of time is an integer number of cycles of the response signal.

23. A method, comprising:
sensing a response signal on a receive electrode in response to a drive signal delivered to a drive electrode that is capacitively coupled to the receive electrode;
applying a time-varying transfer function to the response signal, the transfer function varying proportionately and synchronously with the response signal; and
detecting a touch on a touch sensitive surface using a result of the applying of the transfer function to the response signal.

24. A method of using a touch apparatus that includes a touch sensitive panel comprising at least one drive electrode capacitively coupled to at least one receive electrode, the method comprising:
determining a shape of a response signal for the receive electrode in response to a drive signal delivered to the drive electrode; and
forming a time-varying transfer function that varies proportionately and synchronously with the response signal;
applying the time-varying transfer function to a response signal that includes information about a touch on the touch panel.

25. The method of claim 24, wherein:
applying the transfer function comprises multiplying the transfer function and the response signal; and
further comprising integrating a product of the multiplying over a period of time.

26. The method of claim 25, wherein the period of time comprises an integer multiple of a period of the response signal.

27. The method of claim 24, wherein the response signal and the time-varying transfer function are represented in digital format.

28. The method of claim 24, wherein each of the response signal and the time-varying transfer function are represented as vectors comprising a series of values at discrete sequential times.

29. The method of claim 28, wherein applying the transfer function comprises forming a scalar product of the response signal vector and the transfer function vector.

30. The method of claim 24, wherein the response signal and the time-varying transfer function are represented in analog format.

31. A method of calibrating a touch apparatus that includes a touch sensitive panel comprising at least one drive electrode capacitively coupled to at least one receive electrode, the method comprising:
determining a shape of a response signal for the receive electrode in response to a drive signal delivered to the drive electrode; and
forming a time-varying transfer function that varies proportionately and synchronously with the response signal.

32. The method of claim 31, wherein determining the shape of the response signal comprises determining shapes of a number of discrete portions the response signal.

33. The method of claim 32, wherein determining the shape of the response signal comprises determining an average value of the response signal for each of the discrete portions of the response signal.

34. The method of claim 31, wherein the calibrating is performed during an initialization period prior to using the touch apparatus to detect a touch.

35. The method of claim 31, wherein noise is mitigated during at least some portions of the calibrating.

36. The method of claim 31, wherein the response signal comprises a differentiated signal.

37. The method of claim 31, wherein determining the shape of the response signal comprises:
determining a shape and magnitude of a response signal with reduced noise using a near-matching transfer function;
forming an initial transfer function based on the shape and magnitude of the response signal with reduced noise; and
determining a shape and magnitude of a response signal with noise using the initial transfer function.

38. The method of claim 31, wherein forming the time-varying transfer function comprises:
measuring noise;
calculating a noise-subtracted response signal by subtracting the noise from the response signal with noise;
forming a ratio of the noise-subtracted response signal and the noise; and
adjusting the initial transfer function based on the ratio.

39. The method of claim 38, wherein adjusting the initial transfer function comprises adjusting at least one of a time-varying shape and a time-varying magnitude of the initial transfer function.

40. The method of claim 39, wherein adjusting at least one of a time-varying shape and a time-varying magnitude of the initial transfer function comprises:
re-determining the response signal with noise using the initial transfer function at a lagging or leading phase; and
adjusting the shape of the initial transfer function based on the re-determining of the response signal with noise.

41. The method of claim 39, wherein adjusting at least one of a time-varying shape and a time-varying magnitude of the initial transfer function comprises:
re-determining the response signal with noise using a transfer function that is narrower or wider in time than the initial transfer function; and
adjusting the shape of the initial transfer function based on the re-determining of the response signal with noise.

42. The method of claim 39, further comprising:
measuring a noise spectrum; and
adjusting the shape of the initial transfer function based on the noise spectrum.

43. The method of claim 42, wherein determining the noise spectrum comprises determining a shape and magnitude of a noise signal with respect to time.

44. The method of claim 43, wherein determining the shape and magnitude of the noise signal comprises determining shapes and magnitudes of a number of discrete time portions of the noise signal.

45. The method of claim 42, wherein determining the noise spectrum comprises: determining the shape and magnitude of the noise signal at a fundamental frequency of the drive signal; and
determining the shape and magnitude of the noise signal at one or more harmonics of the fundamental frequency.

46. The method of claim 42, wherein determining the noise spectrum comprises determining the shape and magnitude of the noise signal at a frequency less than a fundamental frequency of the drive signal.

47. The method of claim 31, further comprising adjusting a parameter of the touch apparatus to increase a signal to noise ratio.

48. The method of claim 47, wherein adjusting the parameter comprises adjusting a frequency of the drive signal.

49. The method of claim 47, wherein adjusting the parameter comprises adjusting a duration of an integration period.

50. The method of claim 47, wherein adjusting the parameter comprises adjusting a shape or phase of the transfer function.

51. A method of calibrating a touch sensitive panel comprising a plurality of drive electrodes capacitively coupled to a plurality of receive electrodes, the method comprising:
for each receive electrode:
determining a shape of a response signal for the receive electrode in response to a drive signal delivered to the drive electrode; and
forming a time-varying transfer function that varies proportionately and synchronously with the response signal.

52. The method of claim 51, wherein determining the shape of the response signal comprises determining shapes of a number of discrete portions the response signal.

53. The method of claim 51, wherein the calibrating forms an adjusted transfer function for each receive electrode.

54. The method of claim 51, wherein the calibrating forms multiple transfer functions for each receive electrode, each of the multiple transfer functions corresponding respectively to a drive electrode position along the receive electrode.

* * * * *

UNITED STATES PATENT AND TRADEMARK OFFICE
CERTIFICATE OF CORRECTION

PATENT NO. : 10,318,066 B2  
APPLICATION NO. : 15/324369  
DATED : June 11, 2019  
INVENTOR(S) : Cordeiro et al.

Page 1 of 1

It is certified that error appears in the above-identified patent and that said Letters Patent is hereby corrected as shown below:

On the Title Page

Column 2, Item (57), (Abstract)
Line 2, After "one" delete "a".

In the Specification

Column 3
Line 35, After "one" delete "a".

Column 15
Line 39, Delete "and or" and insert -- and/or --, therefor.

Column 28
Line 46, After "one" delete "a".

Column 28
Line 59, After "one" delete "a".

In the Claims

Column 34
Line 4, In Claim 13, after "one" delete "a".

Column 34
Line 17, In Claim 14, after "one" delete "a".

Signed and Sealed this
Third Day of December, 2019

Andrei Iancu
*Director of the United States Patent and Trademark Office*